(12) United States Patent
Fang

(10) Patent No.: US 12,506,406 B1
(45) Date of Patent: Dec. 23, 2025

(54) INPUT STAGE FOR A POWER CONVERTER

(71) Applicant: Regents of the University of Minnesota, Minneapolis, MN (US)

(72) Inventor: Peng Fang, Duluth, MN (US)

(73) Assignee: REGENTS OF THE UNIVERSITY OF MINNESOTA, Minneapolis, MN (US)

(*) Notice: Subject to any disclaimer, the term of this patent is extended or adjusted under 35 U.S.C. 154(b) by 571 days.

(21) Appl. No.: 17/993,237

(22) Filed: Nov. 23, 2022

Related U.S. Application Data

(60) Provisional application No. 63/283,130, filed on Nov. 24, 2021.

(51) Int. Cl.
*H02J 7/00* (2006.01)
*H02J 1/10* (2006.01)
*H02J 7/14* (2006.01)
*H02M 1/00* (2006.01)
*H02M 3/156* (2006.01)

(52) U.S. Cl.
CPC .............. *H02M 3/156* (2013.01); *H02J 1/102* (2013.01); *H02M 1/0022* (2021.05); *H02J 2207/20* (2020.01)

(58) Field of Classification Search
CPC ....... H01M 3/156; H02M 1/0022; H02J 1/102
USPC .......................................................... 320/132
See application file for complete search history.

(56) References Cited

U.S. PATENT DOCUMENTS

| | | | |
|---|---|---|---|
| 6,563,235 B1 | 5/2003 | McIntyre et al. | |
| 7,323,827 B2* | 1/2008 | Nerone | H02M 1/15 315/307 |
| 8,212,541 B2 | 7/2012 | Perreault et al. | |
| 8,446,134 B2* | 5/2013 | Manor | H02M 1/14 363/21.04 |
| 9,240,712 B2* | 1/2016 | Chandrasekaran | H02M 3/1584 |
| 2008/0285316 A1* | 11/2008 | Park | H02M 1/15 363/84 |
| 2009/0212758 A1 | 8/2009 | Asinovski et al. | |
| 2011/0156685 A1* | 6/2011 | Chen | H02M 3/1582 323/284 |
| 2017/0033678 A1* | 2/2017 | Park | H02M 3/156 |
| 2022/0166319 A1* | 5/2022 | Brambilla | H02M 1/0845 |

OTHER PUBLICATIONS

Chen et al. "A High-Power-Density Wide-Input-Voltage-Range Isolated dc-dc Converter Having a MultiTrack Architecture", 2015 IEEE Energy Conversion Congress and Exposition (ECCE), Sep. 2015, pp. 2017-2026.

Fang, P. "A Method of Reconfiguring Flying Capacitor Multilevel Input Stage for Wide Input Voltage Range Converter Design", IEEE Transactions on Power Electronics, Feb. 2022, pp. 1905-1925, vol. 37, No. 2.

(Continued)

*Primary Examiner* — Alexis B Pacheco
(74) *Attorney, Agent, or Firm* — Steven M. Koehler; Westman, Champlin & Koehler, P.A.

(57) ABSTRACT

A reconfigurable flying capacitor multilevel input stage accepts a wide range of input voltages. The input stage divides and inverts a DC input voltage. Generally, output voltage regulation is achieved by adjusting the power switches' duty ratio in the input stage for non-resonant converters and by adjusting the switching frequency for resonant converters.

16 Claims, 15 Drawing Sheets

(56) References Cited

OTHER PUBLICATIONS

Kim et al. "Hybrid Resonant Half-Bridge DC/DC Converter With Wide Input Voltage Range", 2018 IEEE Applied Power Electronics Conference and Exposition (APEC), 2018, pp. 1876-1881.

Liao et al. "Analysis and Design of a High Power Density Flying-Capacitor Multilevel Boost Converter for High Step-up Conversion", IEEE Transactions on Power Electronics, May 2019, pp. 4087-4099, vol. 34, No. 5.

Rice, R. and Fang, P. "Hybrid Switched-Capacitor LLC Converter With Ultra Wide Input Voltage Range and High Efficiency", 2022 IEEE Applied Power Electronics Conference and Exposition (APEC), 2022, pp. 2044-2050.

Salem, L. and Mercier, P. "Recursive Switched-Capacitor DC-DC Converter Achieving 2N—1 Ratios With High Efficiency Over a Wide Output Voltage Range", IEEE Journal of Solid-State Circuits, Dec. 2014, pp. 2773-2787, vol. 49, No. 12.

Stillwell et al. "Active Voltage Balancing in Flying Capacitor Multi-Level Converters With Valley Current Detection and Constant Effective Duty Cycle Control", IEEE Transactions on Power Electronics, Nov. 2019, pp. 11429-11441, vol. 34, No. 11.

Zhang et al. "A DC-DC Converter With Wide Input Voltage Range for Fuel Cell and Supercapacitor Application", 2009 International Conference on Power Electronics and Drive Systems (PEDS), 2009, pp. 706-711.

\* cited by examiner

4:1 dividing ratio operation pattern

3:1 dividing ratio operation pattern

INPUT STAGE FOR A POWER CONVERTER

BACKGROUND

Wide input or output voltage range converters are required in a variety of applications. In rail and industrial applications, different bus voltages are used to distribute power. Wide input voltage range converters can support all different voltages, allowing the same board to be updated and deployed in new systems operating at other voltages. In automotive applications, the battery voltage drops significantly during engine cranking. Wide input range converters allow them to operate through these periods of high load demand without the need to use bulky hold-up capacitance. In renewable energy applications, the input voltage is not well regulated and can fluctuate significantly. A photovoltaic (PV) panels' output voltage fluctuates significantly as the panel is exposed to different sunlight levels. The same is with wind turbine generator output when wind speed changes. Wide input voltage range converters will ensure maximum energy harvesting when these renewable energy sources' output voltages vary widely.

It has been very challenging to achieve optimal operation under a wide voltage range at both component and operational levels. Each operating point has different requirements for optimal components. It often needs to make trade-offs to select components to cover a wide voltage range of operations. No component is optimal for the majority of the operating conditions leading to overall sacrificed efficiency. Often, the voltage stress of power switches in design is coupled with either the input voltage or the output voltage level. Therefore, the voltage stress of power switches increases due to increased input or output voltage levels. Both overlap switching loss and output capacitor switching loss of power switches are heavily associated with power switches' voltage stress. In particular, the output capacitor switching loss of a power switch is proportional to the squared voltage stress of that power switch. Therefore, this type of loss rises very rapidly as the voltage stress of a power switch increases. Power switches with low output capacitors and low gate capacitors will be considered ideal at high input voltage as switching losses are dominant at high input or output voltage levels. At low input voltage, the conduction loss contributes more to the total loss as overlap switching loss and output capacitor switching loss are much lower. Power switches with low on-resistance will be considered ideal. Therefore, it is challenging to achieve optimal operation with one set of components and design parameters while covering a wide voltage range of operation.

A wide voltage range of operation also imposes challenges for efficiency optimization at the operational level. For example, converters aiming to achieve soft switching are often required to be operated in a limited voltage range. Some power converter topologies are extremely intolerant of a wide voltage range of operation. For example, LLC resonant converters' overall efficiency drop significantly when operating frequency shifts away from the resonant frequency of its resonant tank, which is necessitated by a wide range of input or output operation.

Wider input or output voltage range of operation can be achieved with parameter optimization. However, this type of approach is very design and topology specific. It cannot be widely adopted to a variety of different designs. There are also efforts to modify conventional power topologies to achieve multi-mode operations. For example, a rectifier stage is reconfigured to achieve two-fold voltage gains. Similarly, there is also a voltage multiplier method that changes the effective input voltage between Vin and Vin/2. The achievable operating voltage range extension is limited with the above reconfigurable structures. A reconfigurable structure that can achieve more gain options and can be freely resized is more desirable.

One promising solution to achieve broad input or output voltage range of operation is by adopting a reconfigurable switched capacitor structure (RSC). A wide range of input voltage can be converted to voltages within a much smaller range by reconfiguring a switched capacitor with different gains. In addition, using capacitive energy transfer usually achieves a smaller overall size than using inductive energy transfer, and this type of solution is particularly desirable when a small size design is paramount. L. G. Salem and P. P. Mercier and in "A Recursive Switched-Capacitor DC-DC Converter Achieving $2^{N}-1$ Ratios With High Efficiency Over a Wide Output Voltage Range," (IEEE Journal of Solid-State Circuits, vol. 49, no. 12, pp. 2773-2787, December 2014) achieve $2^{N}-1$ different gain options for ultra-wide input voltage range design. However, the complexity required by charging cell interconnections prohibits its implementation with discrete power switches, which is a necessity in high power designs. Also, charge redistribution loss is still a major barrier limiting the application of switched capacitor converters in high power design. Resonant switched capacitor converters achieve soft charging by adding an inductor in the charge transfer loop, eliminating charge redistribution loss. However, voltage regulation is still a shortcoming of switched capacitor converters.

RSC converters are predominantly used in low power applications having space constraint. The charge redistribution loss caused by hard-charging making SC converters non-ideal in intermediate and high power applications. SC stage can be further implemented with soft charging or even soft switching by adding extra inductors in charge transfer loops. These extra inductors used to achieve soft charging/switching are not ideal when higher power density and a higher level of integration between the SC converter stage and the SI converter stage are to be achieved. The other challenge of using a reconfigurable SC converter is achieving fine voltage regulation, which is often critical in higher power designs. It is possible to achieve voltage regulation by operating an SC converter with partially charge transfer. However, efficiency of SC converters is sacrificed. Therefore, a second power stage is often used to regulate the output voltage. Two-stage approach uses an RSC converter as the front-end stage, transforming a wide input voltage range to a bus voltage with a much narrower range. A second Switched Inductor (SI) stage follows the SC stage to achieve voltage regulation.

Two-stages hybrid power conversion structure eliminate the aforementioned undesirable characteristic associated with switched capacitor converters. A reconfigurable switched capacitor converter is used to implement the first input voltage transformation stage. By changing the gain of the first stage, a wide range of input voltages is converted to voltages within a much smaller range, which is the input voltage range of the second regulation stage. In the meantime, the second regulation stage is integrated into the charge transfer operation of the first switched capacitor stage, acting as a power source/current source. Therefore, the charge transfer rate between capacitors in the first stage is controllable, and soft charging is achieved. The two-stage hybrid power conversion structure utilizes both switched converters' and switched inductor converters' (or transformer-based converters) best properties. Switched capacitor converters can convert a wide range of input voltage to voltages within a much smaller range with high power density and also high efficiency if soft charging is achieved. When performing the same task, it can be challenging for switched inductor converters to achieve the same level of power density and efficiency. On the other side, switched capacitor converters are not an effective solution to achieve voltage regulation.

A multi-track power conversion structure tackles a wide range of input voltage operation with multiple power transfer tracks that achieve distributed power processing. The voltage stresses on devices, and the sizes of passive components are reduced. This power conversion architecture combines a switched-capacitor converter and magnetic components to leverage each type of power conversion method's strengths. The number of power tracks can be increased because of modularized architecture.

There are also attempts to address this challenge by modifying conventional power conversion topologies with a reconfigurable feature. For example, input inverter and output rectifier stages for a resonant converter are designed to be reconfigurable to change the voltage conversion gain. There are also methods that optimize circuit parameters of conventional and modified power topologies to achieve a wide voltage range of operation. Tapped inductor Buck converter with negative inductor current has also been used to achieve a wide input voltage range design. By operating the tapped inductor with a negative current, zero voltage switching can be achieved. No additional components are needed compared to a conventional Buck converter, which makes tapped inductor Buck converter a cost-effective solution. However, this method does not seem to be a good option for high output current applications. Operating the inductor with a negative current means a significant ripple current with the inductor. Large current ripple is not desirable for high current applications due to significant core loss and AC winding loss. Such operation also limits the switching frequency of a design. High frequency operation generates higher core loss and AC winding loss, which is not optimal for tapped inductor Buck converter solutions.

Flying capacitor multilevel converters are often considered as preferred power conversion solutions for high step-down ratio designs. It can reduce the size of an output inductor as well as help achieving overall higher power density. Flying capacitor multilevel converters are often referred to as switched capacitor converter as voltage conversion is achieved with charge transferred between flying capacitors with an inductive charging transfer path.

SUMMARY

Power Converter with Reconfiguring a Flying Capacitor Multilevel Input Stage

To address the challenge of achieving wide input voltage range design, in a first aspect a method to reconfigure the flying capacitor multilevel input stage is proposed. The input stage produces a pulse voltage and will need to be connected with a filter stage or a rectifier stage to complete a DC to DC voltage conversion. At conceptual and circuit implementation levels, the advantages include:

1. A modularized structure that can be easily resized for designs with different input voltage range;
2. The input stage itself is optimized in terms of conduction and switching losses, which are minimized despite a wide change of the input voltage level;
3. The components selected for the input stage is optimized. The components selected to implement the input stage are not subject to a wide range of voltage stress change despite a wide input voltage change; and/or
4. The input stage also enables optimization for the followed filter stage, isolation rectifier stage or resonant tank stage.

Compared to other solutions for wide input voltage range designs, the proposed solution has the following features. First of all, the proposed reconfiguration method is applied to the well-known flying capacitor multilevel input stage. Resizing the input stage with different dividing ratios is easily achievable by adding or reducing the number of flying capacitors in the system and associated power switches. Such circuit arrangement provides the flexibility of being adopted in designs with different input voltage ranges. Some earlier designs also use reconfigurable switched capacitor converters as the input stage. However, the reconfigurable switch capacitors' design complexity increases very rapidly when the number of ratio options increases.

Second, the proposed method only reconfigures the input stage, leaving much room for different design options. The input stage has a great potential to interface a variety of different filter stages, isolated or non-isolated rectifier stages to form different designs. For example, an LC filter can follow the reconfigurable flying capacitor multilevel input stage to produce a non-isolated converter. Similarly, a variety of transformer+rectifier stages usually compatible with half or full bridge input stage can also be used with the proposed input stage. Being able to interface with different power conversion structures will promote the adoption of this method. Many existing solutions are based on particular topologies that will limit their adoption.

Furthermore, the proposed method can maintain high efficient operation across ultra-wide input voltage range. By reconfiguring the input stage with different dividing ratios, the voltage across the power switches and the amplitude of the pulse voltage produced by the input stage are maintained relatively constant. They are significantly smaller than the input voltage when a high dividing ratio is configured, which also means a significant reduction of switching loss at high input voltage level under hard-switching operation. For a resonant type design, a relatively constant amplitude pulse feeding the resonant tank ensures high efficiency over a wide input voltage range.

Ideally, the produced pulse voltage features a constant amplitude and frequency despite a wide change of input voltage level. A constant frequency and amplitude pulse voltage are the enablers for overall high efficiency design and system optimization. It allows the followed power conversion stage to be optimized in the best way. For example, a fixed pulse voltage applied to an output inductor offer the opportunity for optimization. Since the voltage-second applied on the inductor does not change with the input, the inductor can be selected for one operating condition. On the contrary, the voltage-second on the output inductor of a conventional Buck converter, or Buck derived isolated converter, varies with the input voltage. The inductor selected for a conventional Buck converter with wide input range needs to be designed for the worst case voltage-second scenario. This compromised selection means not optimized solution in size and power loss for the majority of other operating conditions. When a resonant tank stage is connected with the proposed input stage, a fixed pulse frequency allows the resonant tank to be operated at resonant frequency, which is the preferred operating condition for a resonant converter design and a guarantee for achieving high efficiency. A flying capacitor multilevel input structure also provides the flexibility in control. By reconfiguring the number of active flying capacitor in a design, the voltage stresses on power switches in the input stage do not change with the input voltage level, which is the mechanism of achieving low switching loss and creates the opportunity to select optimal power switches for confined operating condition.

Achieving a constant frequency and amplitude pulse is the ideal situation and is what an actual circuit implementation aimed for. The actual pulse voltage amplitude generated by the input stage is dependent of the number of active flying capacitor. The more flying capacitor is implemented in a design the smaller variation of amplitude will result on the pulse voltage. The output voltage regulation can be achieved by adjusting the pulse width while keeping pulse frequency unchanged when it is connected with a filter stage or an isolation rectifier stage. The output voltage regulation can also be achieved by adjusting the pulse frequency when the input stage is followed by a resonant tank stage.

Power Converter with Reconfigurable Hybrid Switched Capacitor Input Stage

Hybrid SC converters combine switched capacitor stage and SI stage with a higher level of integration. Components are highly shared between two stages, and the function of charging transfer and voltage regulation are blended together. The inductor (main or leakage) from the SI stage is connected in series in the charge transfer loop so that the charge transfer rate between flying capacitors is controlled and charge redistribution loss is eliminated. Voltage regulation can be achieved by changing the duty cycle of the power switches in the SC stage. Hybrid SC converters combine the best features of both worlds. Hybrid SC converters have shown great promise in high power density, high voltage gain dc-dc converter designs. However, hybrid switched-capacitor converters are often designed with a fixed conversion ratio with the SC capacitor stage. Limited voltage range extension is achieved with duty cycle adjustment. It has been demonstrated a reconfigurable structure can achieve wide output voltage range. However, this method cannot be directly transferred to designs requiring wide input voltage range. The main goal of this work is not optimizing over existing hybrid SC converters. Instead, the advantageous features of hybrid SC converters are leveraged with additional reconfigurable structure for wide input voltage range designs. Below are some advantages of the proposed solution that distinguishes itself from existing solutions.

1. The proposed solution achieves easily resizable conversion ratio. A modular charging cell will be used to construct the reconfigurable SC input stage. More charging cells can be added freely in a well-formulated manner to extend the input voltage range. There is no increase in design complexity with more charging cells.
2. The SC input stage reconfiguration can be achieved dynamically based on input voltage level with Smooth transition. A smooth transition between different configurations ensures tight regulation of the output voltage at all time.
3. The SC input stage will be configured to achieve relatively constant voltage stresses on the power switches despite a wide range of the input voltage level. For a hard-switching design, switching losses are heavily dependent on the voltage stresses on power switches. Maintaining relatively constant voltage stresses means maintaining a relatively constant switching loss. Also, power switches can be selected based on a very confined voltage range and are decoupled from the input voltage range.
4. The SC input stage will produce a relatively constant amplitude and frequency pulse at the output of the SC stage. Such an output will enable optimal designs for a filter stage, a transformer stage, or a resonant tank stage that may follow the front-end SC input stage.

DETAILED DESCRIPTION

Flying Capacitor Multilevel Input Stage for a Power Converter

Figure 1:
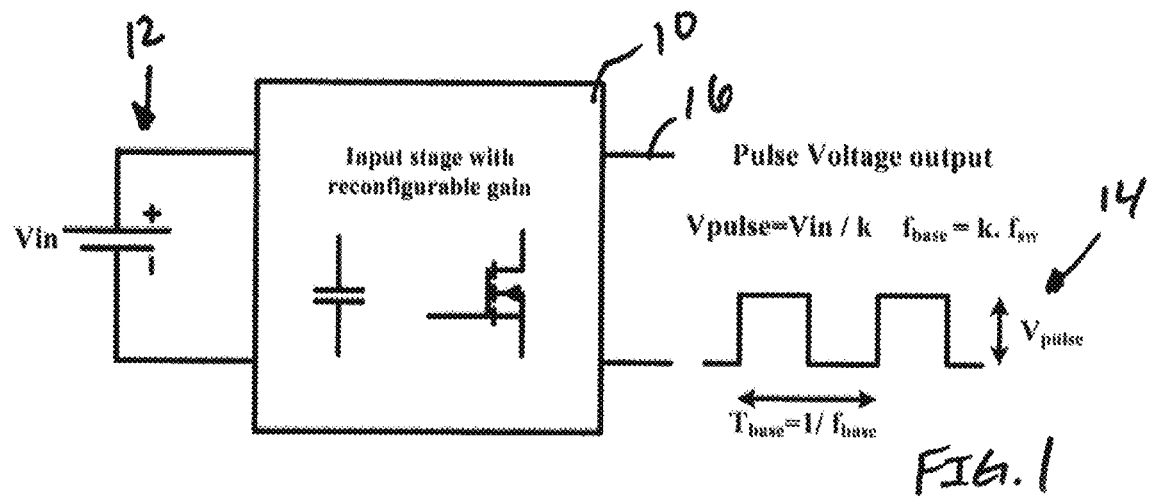
FIG. 1 is a simplified circuit diagram of a reconfigurable flying capacitor multilevel input stage.

FIG. 1 shows the concept of reconfiguring a flying capacitor multilevel input stage 10 for a wide range of input voltage design. The input stage 10 divides and inverts a DC input voltage 12. It can be followed by a LC filter, not shown, to make a non-isolated design, if desired. For isolated designs, an additional transformer and a rectifier are needed. In a case of resonant converter design, a resonant tank follows the flying capacitor multilevel input stage 10 with additional isolation stage and rectifier stage. Generally, output voltage regulation can be achieved by adjusting the power switches' duty ratio in the input stage 10 for non-resonant converters and by adjusting the switching frequency for resonant converters.

The multilevel input stage 10 divides and inverts a DC input voltage 12 to a pulse voltage 14 at a switching node 16. The ratio between the input voltage 12 and the amplitude of pulse voltage 14 is defined as the input stage's dividing ratio, represented by symbol k. The dividing ratio k is reconfigurable in the proposed method by changing the states of power switches in the input stage 10. With proper selections of k under different input voltage level, the amplitude of the pulse voltage 14 presenting at the switching node 16 can be maintained relatively constant, despite a wide change of input voltage 10. It should be noted that not only the amplitude of the pulse voltage 14 at the switching node 16 is maintained relatively constant, the voltage stresses presenting on power switches of the input stage 10 are also maintained relatively constant. Therefore, power switches in the input stage 10 and the filter inductor as in this example can be selected with optimization. In an isolated converter design, that also means the transformer in the insolated converter design can be designed with optimization. In contrast, with a half-bridge input, rather than the DC input voltage 12 the amplitude of the pulse voltage 14 presenting at the switching node 16 and the voltage stresses on power switches change along with the input voltage level. Therefore, the power switches and the output inductor in a conventional Buck converter to other half bridge input based designs need to be selected to cover broad operating conditions associating with a wide change of the input voltage.

A frequency multiplying effect is seen at the switching node 16. The frequency of the pulse voltage 14 at the switching node 16 is equal to the switching frequency dividing ratio achievable is 5:1, and the minimum dividing ratio is 1:1. A base voltage, $V_{base}$, is introduced to describe the input voltage level 12. In this case, the minimum input voltage 12 is $V_{base}$, and the maximum input voltage 12 is $6V_{base}$. The dividing ratio, k, of the input stage 10 can be reconfigured between 1 to 5. The entire input voltage 12 range is further segmented into five smaller subranges. By applying different dividing ratios when the input voltage 12 is within different subranges, a wide range of input voltage 12 can be converted to pulse voltages 14 with a much smaller amplitude range. For instance, when the input voltage 12 is within the subrange [$5V_{base}$-$6V_{base}$], by reconfiguring the multilevel input stage 10 with a dividing ratio of 5:1, the DC input voltage 12 is transformed to pulse voltage 14 with an amplitude of $V_{in}/5$, and it is within the range of [$1V_{base}$-$1.16V_{base}$]. As an example, shown in TABLE 1, the input voltage 12 has a ratio of 6:1, but the amplitude of the pulse voltage 14 at the switching node 16 varies only from $V_{base}$ to $2 V_{base}$, which is a ratio of 2:1 and is three times smaller than the input voltage 12 ratio.

TABLE 1

An example reconfiguring scheme for flying capacitor multilevel converter

| | Dividing ratio | Vin | Amplitude of the pulse at switching node | Pulse amplitude range at switching node | Switching frequency |
| --- | --- | --- | --- | --- | --- |
| State 1 | 5 | [$5 V_{base}$ –$6 V_{base}$) | Vin/5 | [$1 V_{base}$ –1.16 $V_{base}$) | $f_{base}$/5 |
| State 2 | 4 | [$4 V_{base}$ –$5 V_{base}$) | Vin/4 | [$1 V_{base}$ –1.25 $V_{base}$) | $f_{base}$/4 |
| State 3 | 3 | [$3 V_{base}$ –$4 V_{base}$) | Vin/3 | [$1 V_{base}$ –1.33 $V_{base}$) | $f_{base}$/3 |
| State 4 | 2 | [$2 V_{base}$ –$3 V_{base}$) | Vin/2 | [$1 V_{base}$ –1.5 $V_{base}$) | $f_{base}$/2 |
| State 5 | 1 | [$1 V_{base}$ –$2 V_{base}$) | Vin | [$1 V_{base}$ –2 $V_{base}$) | $f_{base}$/1 | multiplying the dividing ratio k of the input stage 10 and is defined as base frequency, $f_{base}$. The proposed method will keep the base frequency unchanged despite having a reconfigurable dividing ratio k, which offers the opportunity to optimize the design of the followed output inductor. The dividing ratio of the input stage 10 is reconfigured automatically as the input voltage level 12 changes. A greater dividing ratio will be configured for the input stage 10 when the input voltage 12 is higher to maintain a relatively constant pulse voltage 14 amplitude. For example, to produce a 30V pulse voltage 14 at the switching node 16, a dividing ratio of 4:1 will be configured for the input stage 10 when the input voltage 12 is 120V. A dividing ratio of 2:1 will be configured for the input stage 10 to maintain a 30V pulse output voltage 14 at 60V input voltage 12. Operating under different switching frequencies introduces conduction noises at different frequency. With a good input filter design, the conduction noise can still be suppressed under the limits of related standards. For example, a critical conduction mode PFC has even wider range operating frequency. A well-designed input filter can ensure EMI compliance. It is worth to note that changing switching frequency is not a necessity for PWM based designs. When output voltage 14 is regulated by duty cycle, there is no restriction of operating the proposed converter with constant switching frequency. A constant pulse frequency produced by the input stage 10 is extremely beneficial when a resonant tank follows the proposed input stage 10, which ensures close to resonant frequency operation.

TABLE 1 shows an example of configuring a flying capacitor multilevel converter with a different dividing ratio and changing switching frequency accordingly to maintain a fixed base frequency. It is assumed that the maximum For example, when the input voltage 12 changes from 30V to 180V, the base voltage $V_{base}$ can be set to be 30V. The input dividing ratio is set at 1:1 when the input voltage 12 varies within the subrange of [30V to 60V). The input stage's 10 dividing ratio is set to be 2:1 when the input voltage 12 varies within the subrange [60V to 90V). The input dividing ratio is set to be 3:1 when the input voltage 12 varies in the subrange of [90V to 120V). The input dividing ratio is set to be 4:1 and when the input voltage 12 varies in the subrange [120V to 150V). The input dividing ratio is set to be 5:1 when the input voltage 12 varies in the subrange [150V to 180V). The maximum amplitude of the voltage pulse 14 presenting at the switching node 16 is 60V when the input voltage 12 is just below 60V and input dividing ratio is 1:1 and the minimum amplitude of the voltage pulse 14 is 30V. Compared to the input voltage ratio of 6:1, the variation of the switching node 16's pulse amplitude is three times smaller.

The switching frequency is also configured accordingly to maintain a fixed base frequency under different input dividing ratio. The switching frequency needs to be set at $f_{base}/k$ when the input stage 10 is configured with a ratio of k:1. For example, when the input dividing ratio is 4:1, to achieve 2 MHz $f_{base}$, the switching frequency is set to be 500 kHz. When the input stage 10 has a dividing ratio of 3:1, the switching frequency needs to be changed to 666 kHz to maintain a 2 MHz base frequency at the switching node 16.

Operating Principle and Implementation

Figure 2A:
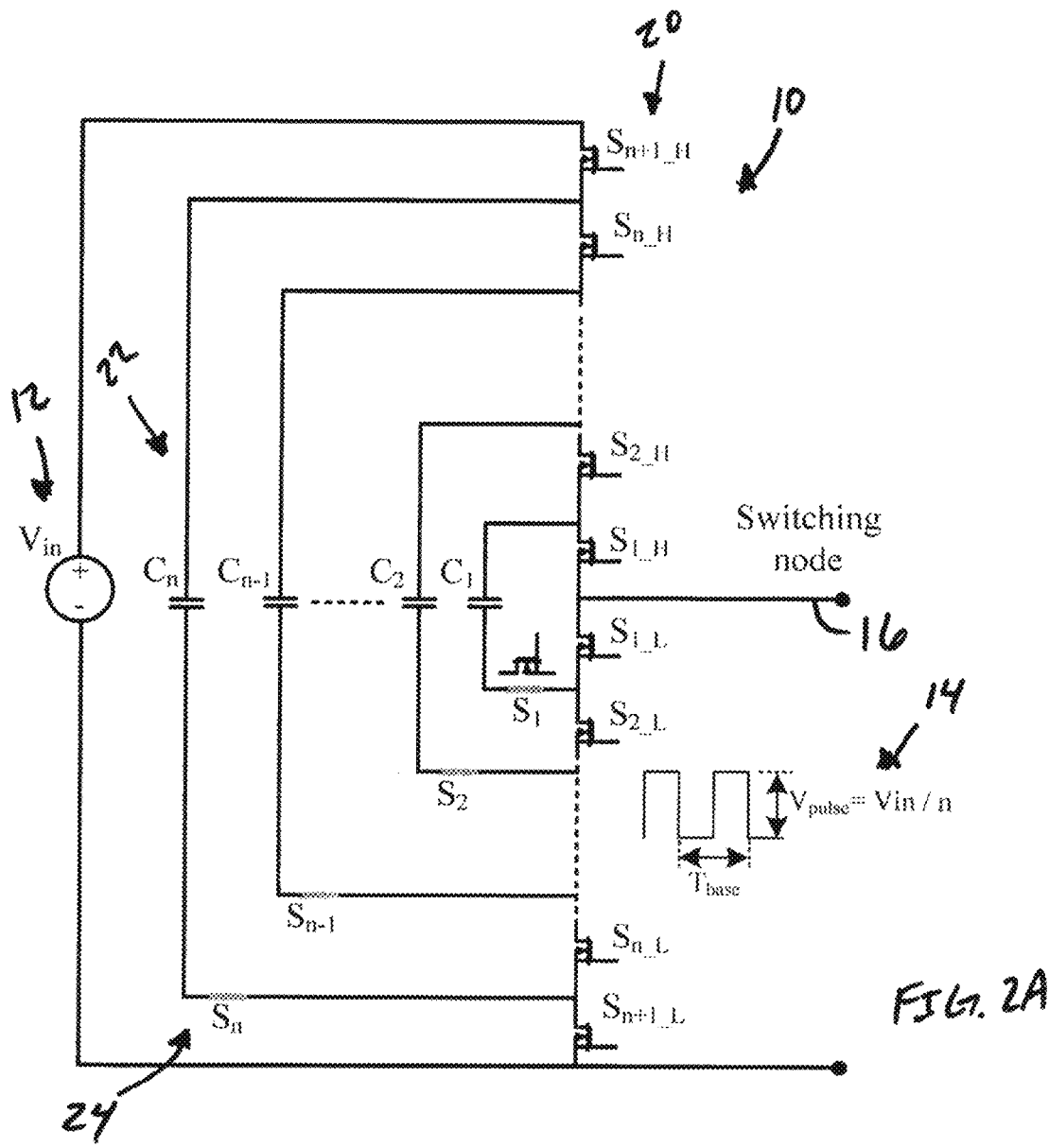
FIG. 2A is a schematic circuit diagram of an implementation of the reconfigurable flying capacitor multilevel input stage.

FIG. 2A shows the circuit implementation of a reconfigurable flying capacitor multilevel input stage 10. Regulation of the output voltage 14 can be achieved by adjusting the duty ratio of power switches 20 or switching frequency in the input stage 10, depending on the type of power converters. The stages following the input stage 10 act as a current source controlling charge transfer rate between flying capacitors 22. Therefore, soft charging is always achieved, and there is no charge redistribution loss generated in the flying capacitor multilevel input stage 10. The operating principle of a flying capacitor multilevel converter is well explained in varies literatures such as Liao, Y. Lei and R. C. N. Pilawa-Podgurski, "Analysis and Design of a High Power Density Flying-Capacitor Multilevel Boost Converter for High Step-Up Conversion," in IEEE Transactions on Power Electronics, vol. 34, no. 5, pp. 4087-4099, May 2019, and Stillwell, E. Candan and R. C. N. Pilawa-Podgurski, "Active Voltage Balancing in Flying Capacitor Multi-Level Converters With Valley Current Detection and Constant Effective Duty Cycle Control," in IEEE Transactions on Power Electronics, vol. 34, no. 11, pp. 11429-11441, November 2019, doi: 10.1109/TPEL.2019.2899899 and will not be discussed in detail in this paper, but are incorporated by reference in their entirety. Herein the focus is on the specific operation required to reconfigure a flying capacitor multilevel input stage 10, to achieve proper input voltage 12 dividing ratio and to maintain a fixed base frequency under different dividing ratios.

Figure 2B:
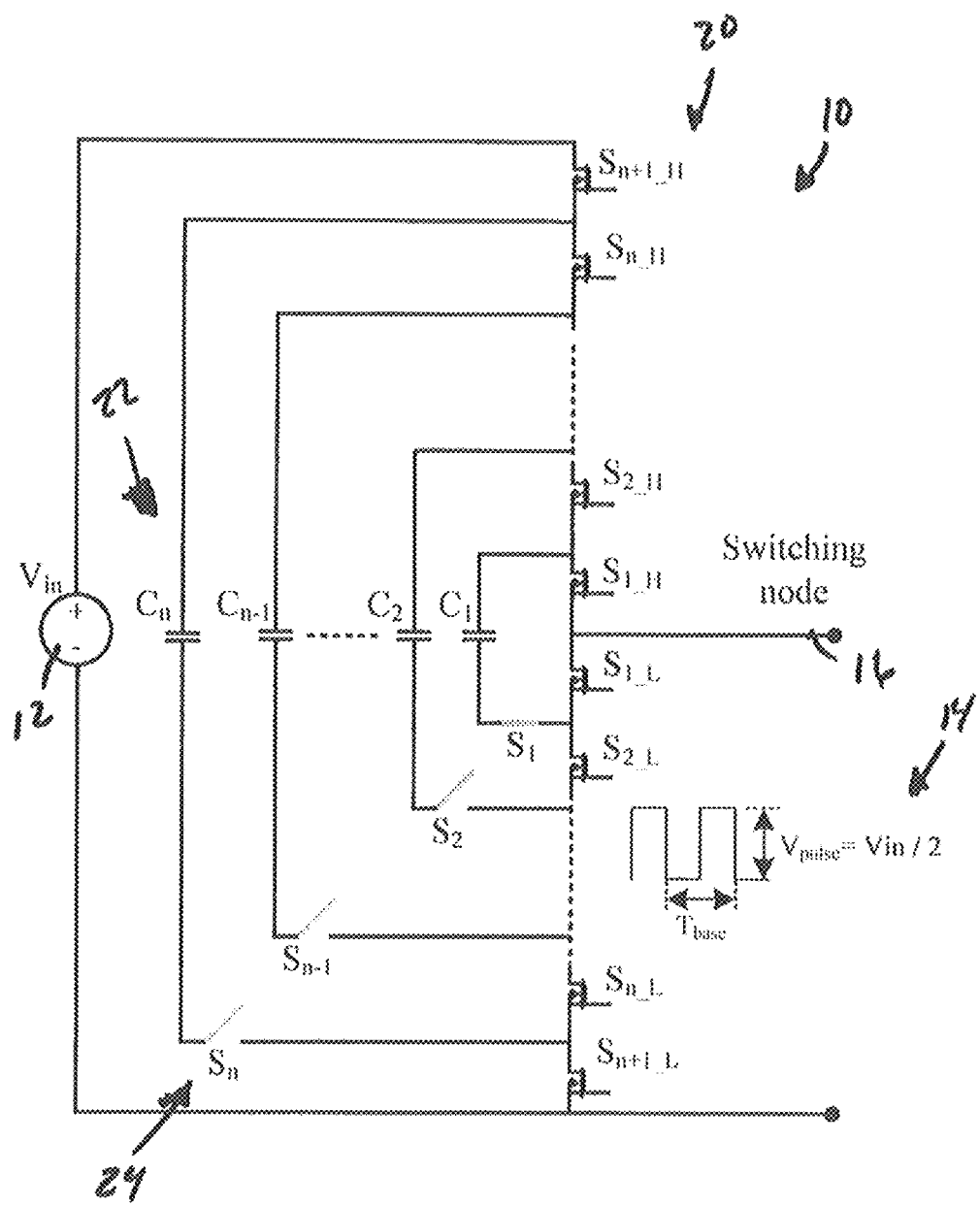
FIG. 2B is the schematic circuit diagram of FIG. 2A in an exemplary operating state.

There is an additional series capacitive switch, $S_n$ to $S_1$, (collectively indicated at 24) for operatively connecting a flying capacitor Cn to C1 (collectively indicated at 22), respectively. The dividing ratio of the input stage 10 is determined by the number of active flying capacitors 22. The series capacitive switches 24 are used to engage/dis-engage each associated flying capacitor Cn to C1 to achieve reconfigurable dividing ratios. The on resistance of the series capacitive switches 24 are expected to be low in order to minimize the additional conduction loss generated by the series capacitive switches 24. There are no switching performance requirements on the series capacitive switches 24 as they stay open or closed during a particular configuration. FIG. 2A shows the circuit configuration with all series capacitive switches 22, Sn, to S1 are closed so that all flying capacitors 22 from Cn to C1 are engaging to ladder down the input voltage 12 to a much lower-level pulse voltage 14 at the switching node 16, just like the operation of a conventional flying capacitor multilevel converter. The dividing ratio can be achieved with the multilevel input stage is (n+1):1. FIG. 2B shows the circuit configuration with only $C_1$ being still in the system that ladders down input voltage 12 and the input stage 10 achieves 2:1 dividing ratio. If $C_1$ is further disconnected in the system by opening $S_1$, the input stage achieves 1:1 dividing ratio. When a flying capacitor 22 is disconnected from the system, the corresponding high side and low side switches 20 that connect it to the input voltage source 12 or a higher voltage flying capacitor 22 are put in always-on state. For example, the high side switch $S_{n+1\_H}$ and the low side switch $S_{n+1\_L}$ are in always-on state after $C_n$ is disconnected. Other high side and low side power switches 20 will be put in always-on state sequentially as flying capacitors 22 are disabled in order.

TABLE 2

Voltage on power switches, flying capacitors and amplitude of pulse voltage on switching node

| The number of active flying capacitors | $V_{Cn}$ | $V_{Cn-1}$ | $V_{Ck}$ | $V_{c2}$ | $V_{C1}$ | Open series switch | Idle power switches | The voltage stress on active power switches | The amplitude of pulse voltage at the switching node |
|---|---|---|---|---|---|---|---|---|---|
| n | $\frac{n}{n+1}V_{in}$ | $\frac{n-1}{n+1}V_{in}$ | $\frac{k}{n+1}V_{in}$ | $\frac{2}{n+1}V_{in}$ | $\frac{1}{n+1}V_{in}$ | No | No | $\frac{1}{n+1}V_{in}$ | $\frac{1}{n+1}V_{in}$ |
| (n − 1) | $\frac{n-1}{n}V_{in}$ | $\frac{n-2}{n}V_{in}$ | $\frac{k-1}{n}V_{in}$ | | $\frac{1}{n}V_{in}$ | D.C | $S_1$ | $S_{1\_H}, S_{1\_L}$ | $\frac{1}{n}V_{in}$ | $\frac{1}{n}V_{in}$ |
| 2 | $\frac{2}{3}V_{in}$ | $\frac{1}{3}V_{in}$ | D.C | D.C | D.C | $S_1, S_2 \ldots$ to $S_{n-2}$ | $S_{1\_H}$ to $S_{n-2\_H}$, $S_{1\_L}$ to $S_{n-2\_H}$ | $\frac{1}{3}V_{in}$ | $\frac{1}{3}V_{in}$ |
| 1 | $\frac{1}{2}V_{in}$ | D.C | D.C | D.C | D.C | $S_1, S_2 \ldots$ to $S_{n-1}$ | $S_{1\_H}$ to $S_{n-1\_H}$, $S_{1\_L}$ to $S_{n-1\_L}$ | $\frac{1}{2}V_{in}$ | $\frac{1}{2}V_{in}$ |
| 0 | D.C | D.C | D.C | D.C | D.C | $S_1, S_2 \ldots$ to $S_n$ | $S_{1\_H}$ to $S_{n\_H}$, $S_{1\_L}$ to $S_{n\_L}$ | $V_{in}$ | $V_{in}$ |

Note:
D.C means disconnect in the above table

It is worth mentioning that the series capacitive switch 24 used to engage and disengage flying capacitors 22 are not a necessity to achieve smooth dividing ratio change. Engaging or disengaging a flying capacitor 24 can also be achieved by changing the operation of high and low side power switches 20. For example, to disengage $C_n$, one can turn on $S_{n\_H}$ and $S_{n-1\_H}$ simultaneously (Similarly for $S_{n\_L}$ and $S_{n-1\_L}$). In other words, $S_{n\_H}$ and $S_{n-1\_H}$ are operated together, acting as a single power switch. When doing so, the capacitor $C_n$ is disengaged in the system and there is no charge transfer with $C_n$. Eliminating these series capacitive switches can reduce costs. However, the additional series capacitive switches 24 can bring in some benefit. With the series capacitive switches 24 connected to each associated capacitor 22, the high side switch $S_{n\_H}$ and the low side switch $S_{n\_L}$ can be put in an always-on state when $C_n$ is disengaged, avoiding gate driving loss.

When all n flying capacitors 22 are engaging in charging transferred, the amplitude of the pulse voltage 14 at the switching node 16, $V_{pulse}$, is Vin/(n+1), which is (n+1) times smaller than the input voltage 12. The number of flying capacitors 22 engaging in ladder down input voltage determines the input stage's 10 dividing ratio. For flying capacitor $C_k$, where $1 \leq k \leq n$, the voltage across $C_k$ is a DC and it is equal to k. $V_{in}/(n+1)$. The voltage stresses across all active high side and low side power switches 20 are equal to $V_{in}/(n+1)$ as well. When the input stage 10 is reconfigured with a different number of active flying capacitors 22, the voltage stress of power switches 20, the DC voltage on flying capacitors 22, the status of power switches 20, the status of series capacitive switches 24, as well as the pulse amplitude 14 at the switching node 16 are summarized in TABLE 2.

In addition to achieving reconfigurable dividing ratios with the input stage 10, the switching frequency is also changed accordingly to maintain a fixed base frequency $f_{base}$, which is the switching node's 16 pulse frequency and is equal to $f_{sw}$. k, where k is the dividing ratio of the input stage 10. When the input dividing ratio is (n+1):1, the switching period T is (n+1) times of the base period, $T_{base}$, the reciprocal of $f_{base}$. When the input dividing ratio is reduced to n:1, the switching period T is adjusted to be n times of the base period to maintain a fixed $T_{base}$ or $f_{base}$.

Figure 4:
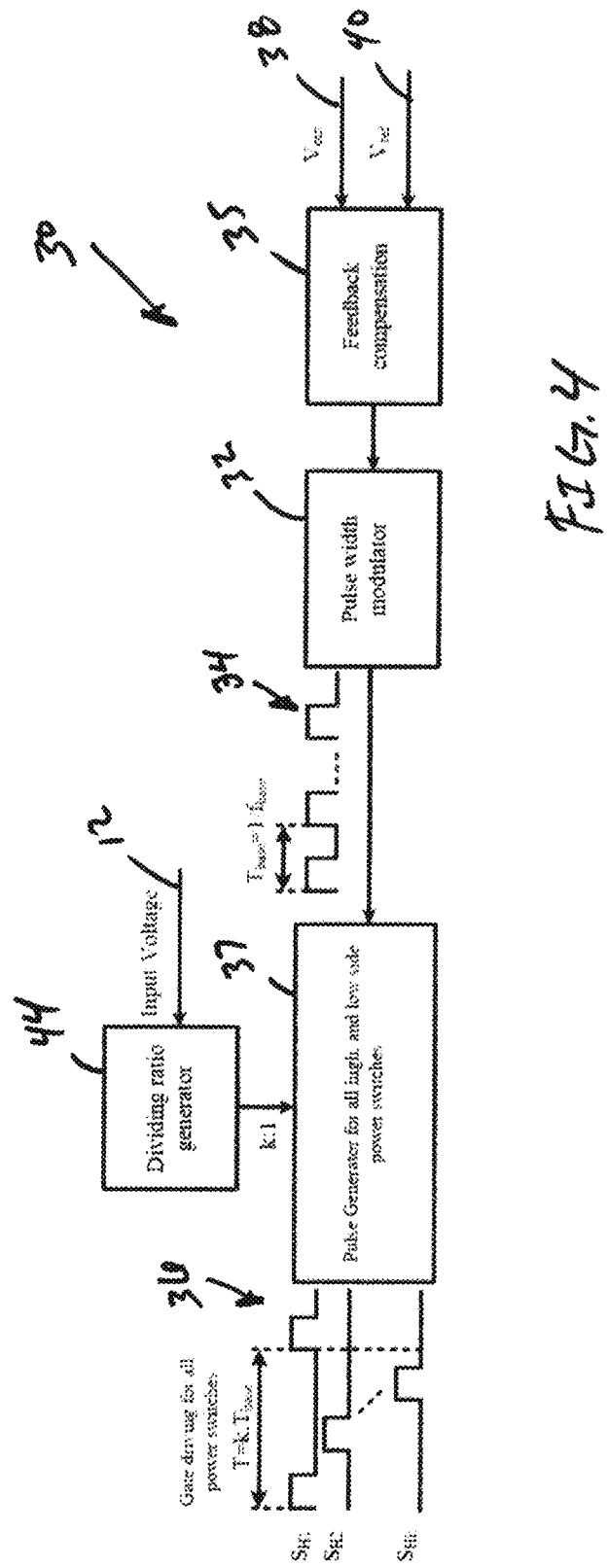
FIG. 4 is a block diagram of a control circuit.

FIG. 4 shows a control circuit of controller 30 of a proposed power converter for controlling the input stage 10. A pulse modulator 32 generates a reference pulse 34 that is used to further produce gate driving signals 36 for all power switches 20 from pulse generator 37. The reference pulse 34 can be modulated with pulse width or pulse frequency, depending on the type of converter. A feedback loop compensator 35 automatically ensures $V_{out}$ 38 (based on the switching node 16) following a reference voltage 40. As indicated above, input stage 10 can be followed by a LC filter, not shown, to make a non-isolated design, if desired. For isolated designs, an additional transformer and a rectifier are needed. In a case of resonant converter design, a resonant tank follows the flying capacitor multilevel input stage 10 with additional isolation stage and rectifier stage. The output voltage $V_{out}$ 38 is obtained after any of these additional circuits or components. Generally, output voltage 38 regulation can be achieved by adjusting the power switches' 20 duty ratio in the input stage 10 for non-resonant converters and by adjusting the switching frequency for resonant converters.

The reference pulse 34 frequency is the frequency of the pulse generated by the flying capacitor multilevel input stage 10, which is also k times of the switching frequency, where k is the dividing ratio of the input stage 10. The dividing ratio is pre-mapped for each input voltage subrange. With the input voltage 12 being sensed, a proper dividing ratio will be generated automatically by the input stage dividing ratio generator 44. The maximum dividing ratio is a known parameter in a design. Based on the present dividing ratio generated in the system, the gate driving pulse generator 37 is informed via the signal from dividing ratio generator 44 which flying capacitors 22 need to be disconnected from the system, and the associated power switches 20 need to be put in always-on state. For example, in a design with three flying capacitors, a maximum 4:1 dividing ratio can be achieved. When the control system demands a 3:1 dividing ratio, the flying capacitor $C_1$ needs to be disconnected from the system by opening $S_1$. The power switches $S_{1\_H}$ and $S_{1\_L}$ need to be put in always-on state. The gate driving signals for all high side active power switches can be generated from the reference pulse train 34 sequentially in a time-multiplexing manner. It should be noted all gate driving signals for the low side power switches 20 can also be generated as they are complementary to the corresponding high side power switches gate driving signals.

Figure 3A:
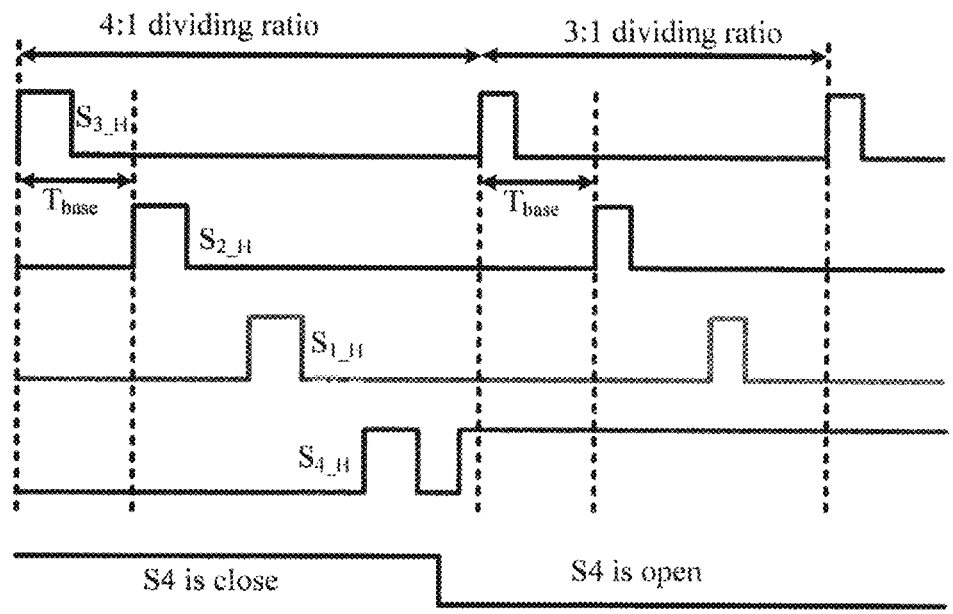
FIGS. 3A-3B illustrate waveforms during a transition from a 4:1 dividing ratio to a 3:1 dividing ratio.
Figure 3B:
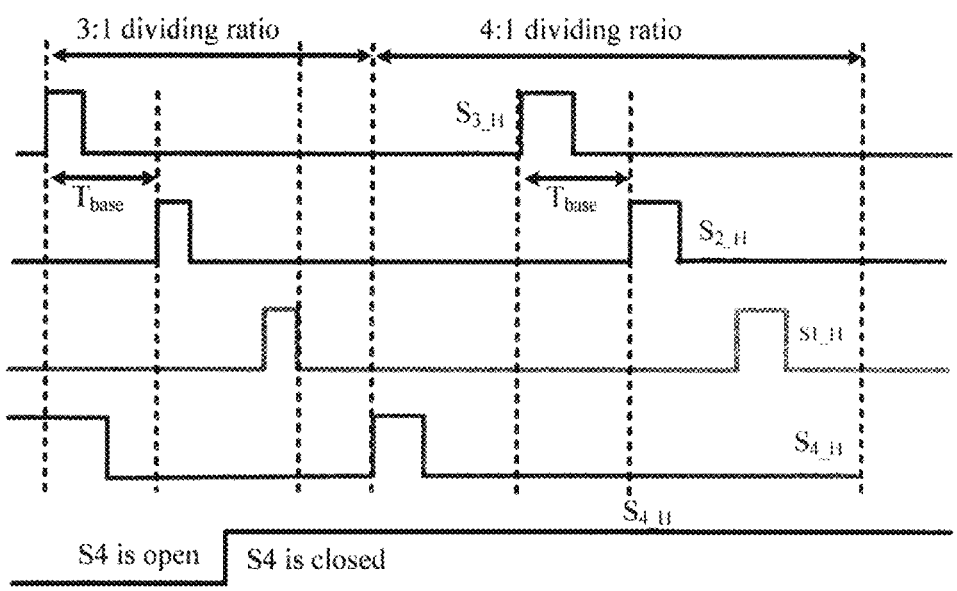

In some applications, such as battery-powered design or solar energy harvesting, the dividing ratio will be required to be reconfigured as the input voltage 12 changes dynamically. FIGS. 3A-3B illustrate the key waveforms during a transition from 4:1 dividing ratio to 3:1 dividing ratio (FIG. 3A). When a dividing ratio transition is demanded, the flying capacitor $C_3$ will be disconnected from the system to achieve 4:1 to 3:1 dividing ratio transition. $C_3$ is disconnected in the input stage 10 by opening $S_3$ when charge transfer is done with $C_3$ in the present switching cycle (means the turn-on time for $S_{4\_H}$ is ended). $S_{4\_H}$ and $S_{4\_L}$ can be changed to always-on state immediately after $S_{4\_H}$ is turned off. No surge current will be generated during this process because $C_3$ is already disconnected from the system. To reconnect $C_3$ back in the input stage 10 as illustrated in FIG. 3b, the high side switch $S_{4\_H}$ can be turned off first during one of the off periods. The series capacitive switch $S_3$ can be closed immediately after the turn-off of $S_{4\_H}$. At then, $C_3$ is reconnected back to the system. $S_{4\_H}$ and $S_{4\_L}$ can restore regular operation so that $C_4$ functions as a flying capacitor again in the system.

Figure 5A:
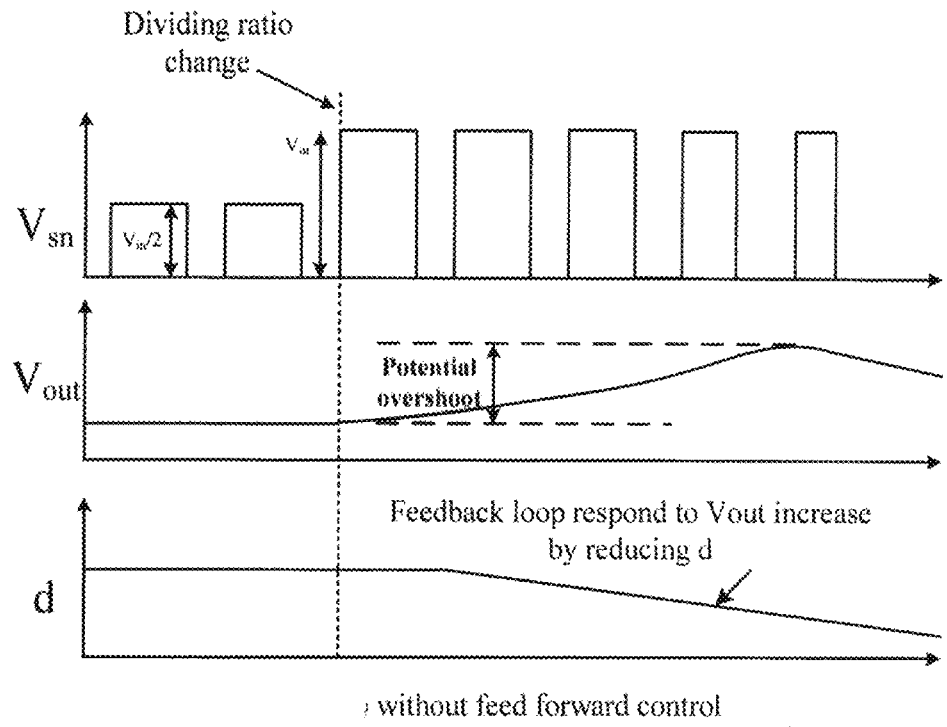
FIG. 5A illustrates voltages without feedforward control.
Figure 5B:
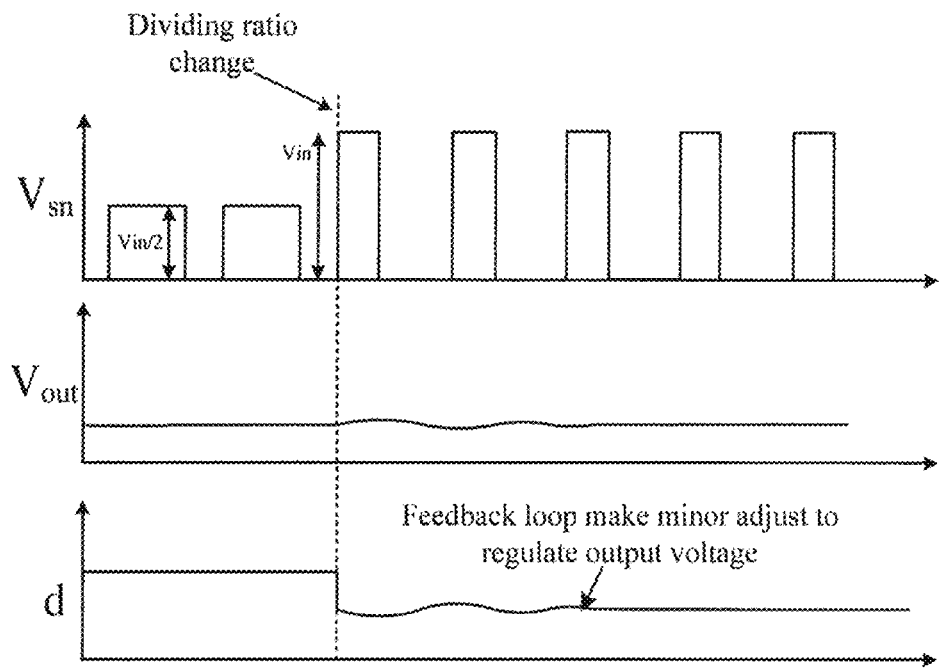
FIG. 5B illustrates voltages with feedforward and feedback control.

Dividing ratio change may impose a disturbance to the system if not be handled properly. The voltage presents at the switching node 16 has a sudden change during a dividing ratio change. Feedforward control is needed to ensure a smooth transition. FIG. 5A illustrates the sudden change on the switching node 16 voltage $V_{SN}$ when the dividing ratio changes from 2:1 to 1:1. Before the dividing ratio transition, the amplitude of the pulse voltage 14 presenting at the switching node 16 is $V_{in}/2$. After the transition, the amplitude of the pulse voltage at the switching node 16 is equal to the input voltage 12, which will lead to an output voltage $V_{out}$ 38 rise if the duty cycle remains the same after the transition. Without feedforward control, the feedback loop compensator 35 responds to this disturbance to bring the output voltage $V_{out}$ 38 back to the regulated value or reference voltage 40. Depending on the loop response, the output voltage $V_{out}$ 38 may experience an unacceptable level of overshoot before the feedback loop compensator 35 can bring the duty cycle and output voltage down to the regulated level. To avoid acceptable overshoot, feedforward control is introduced. FIG. 5B illustrates the feedforward control concept. Since the dividing ratio transition points are predefined, the expected duty cycle after the transition can be estimated. In this 2:1 to 1:1 dividing ratio change, the expected duty cycle after the transition should be equal to half of that before the transition. A feedforward control algorithm, which receives an input indicative of the need to change the dividing ratio (the number of capacitors engaged) and when the transition will occur, can abruptly change the duty cycle to half of the duty cycle value prior to the transition. Therefore, the average voltage presenting at the switching node 16 does not change before and after the transition, and the potential output voltage overshoot after the transition is avoided. This feedforward control can be incorporated in the pulse generator 37.

The feedforward and feedback control act concurrently. The feedforward control only makes necessary step adjustments on the duty cycle produced by the feedback loop compensator 35 during the transition. It does not interfere with the behavior of the feedback loop compensator 35. It is understood that the feedforward control does not function to tightly regulate the output voltage $V_{out}$ 38, which is taken care of by the feedback loop compensator 35. During the dividing ratio change, the feedback loop compensator 35 acts no differently as any other operating points. It continuously corrects the duty cycle to regulate the output voltage $V_{out}$ 38. In an event a dividing ratio change is required in the middle of a fast line change, the feedforward control will be applied the same way. It is assumed that the feedback loop compensator 35 is fast enough to respond to the fast line voltage change. In this way, the output voltage $V_{out}$ 38 will stay regulated, and the duty cycle prior to the dividing ratio change is very close to the duty cycle under steady-state operation. Therefore, pre-mapped duty cycle adjustment can be applied in feedforward control in the middle of fast line voltage change.

Also, in a practical design, the input line voltage contains a lot of noise. To avoid false trigger caused by line noise, a hysteresis band can be introduced for dividing ratio transition going up and going down.

The proposed method of reconfiguring the multilevel input stage can be applied to any existing designs that is compatible with flying capacitor input stage to achieve high efficiency under wide input voltage range. There are some common benefits among various designs when adopting the proposed method, such as relative constant voltage stresses on power switches, relatively constant pulse amplitude and pulse frequency. However, there are also uniqueness from different designs and the achievable benefit with different types of designs will be different. For example, when the proposed method is applied to non-resonant multilevel converters, the benefit will be demonstrated by achieving optimized the output inductor, significantly reducing switching loss if operated with hard switching. When the proposed method is applied to resonant multilevel converter designs, the benefit will be demonstrated by having a much narrower switching frequency range, which is a necessity for a resonant converter to achieve overall high efficiency.

A method of reconfiguring the flying capacitor multilevel input stage's dividing ratio is presented to achieve and maintain high efficiency under a wide range of input voltage operation. The method is exemplified by a reconfigurable flying capacitor multilevel Buck converter. The input stage divides the input voltage with different ratios under different input voltage levels so that the dynamic voltages across the power switches are maintained relatively constant despite a wide change of the input voltage. Thus, the switching losses are kept low even under high input voltage and optimal power switches can be selected for confined operating conditions.

Although a high and maintained efficiency curve is demonstrated based on a reconfigurable flying capacitor multilevel Buck converter prototype, a similar efficiency improvement can be obtained on other isolated/non-isolated designs based on the same reconfigurable multilevel input stage over half bridge input stage based designs.

Reconfigurable Hybrid Switched Capacitor Input Stage for a Power Converter

Although hybrid SC converter had been used in designs to achieve high power density and high conversion ratio, it is still a new endeavor to bring the advantageous of hybrid SC converter in wide input voltage range designs. For Ladder, series-parallel and Fibonacci SC converters, there are multiple charge transfer paths between flying capacitors and these charge transfer paths cannot share one single inductor to achieve soft charging. The multitrack power conversion structure uses ladder SC converter to produce multiple power tracks. However, there are hard charging takes place between flying capacitors. Dickson SC converter had been designed to achieve hybrid operation with soft charging. It is still yet to be discovered how to further repurpose hybrid Dickson SC converter for a wide input voltage range design.

Figure 6:
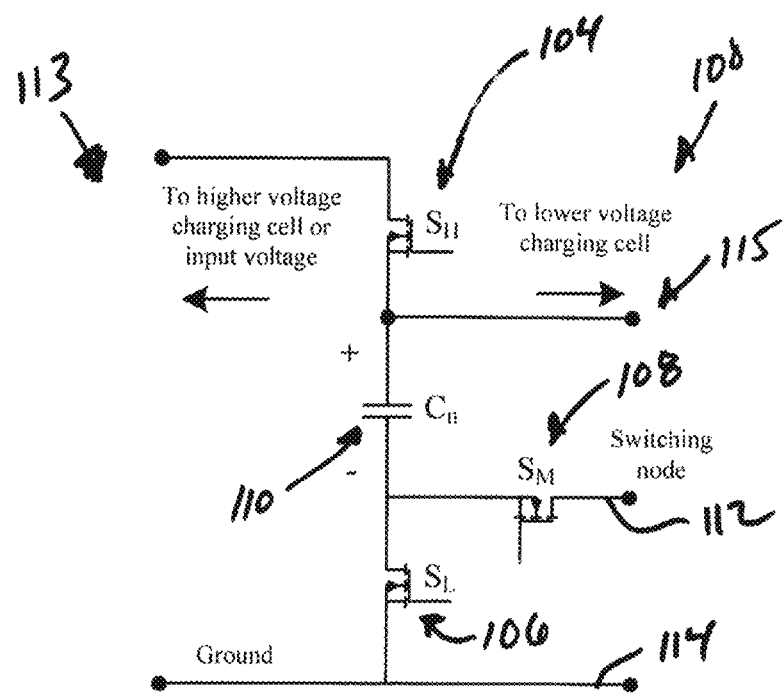
FIG. 6 is a schematic diagram of a charging cell.

Modular structure SC converter had been proposed with fixed conversion ratio and hard charging. In present disclosure, a way to reconfigure the modular SC input stage with additional soft charging is investigated. The effective number of charging cell will be configured according to the input voltage level. The proposed reconfigurable SC input stage can work with a variety of merged second stages, such as a filter stage, a transformer stage, a rectifier stage, a resonant stage or a combination of these to achieve complete designs. The inductive components in the second half-stage controls the charge transfer rates between flying capacitor to achieve soft charging. Also, a method to achieve smooth transition is introduced to eliminate the needs of using extra regulation stage. FIG. 6 shows the structure of a charging cell 100. FIGS. 2A-2C show the circuit implementation and the operation of a 3-charging cells input stage 102.

The charging cell 100 has three power switches 104, 106, 108 and one flying capacitor 110. The power switch 104 that is connected to the positive terminal of the flying capacitor 110 is referred to herein as high side power switch SH. The power switch 106 with one side connected to the negative side of the flying capacitor 110 and the other side connected to the switching node 112 is referred to herein as a middle side power switch SM. The power switch 108 with one side connected to the negative terminal of the capacitor 110 and other side connected to the ground 114 is referred to herein as low side power switch SL. The charging cell 100 can receive charges from another higher voltage charging cells (or voltage source) at 113 and ground 114 and transfers the charges to another lower voltage charging cell (or load) at 115 and ground 114.

The flying capacitors 110 in the charging cells ladder down the input voltage linearly. The voltage step between two successive flying capacitors is $V_{in}/(n+1)$, where n is the number of effective charging cell in the input stage. (n+1) is the total conversion ratio produced by the SC input voltage stage, where dividing ratio is defined as the amplitude of the input voltage over the amplitude of the PWM pulse produced by the input stage.

Figure 7A:
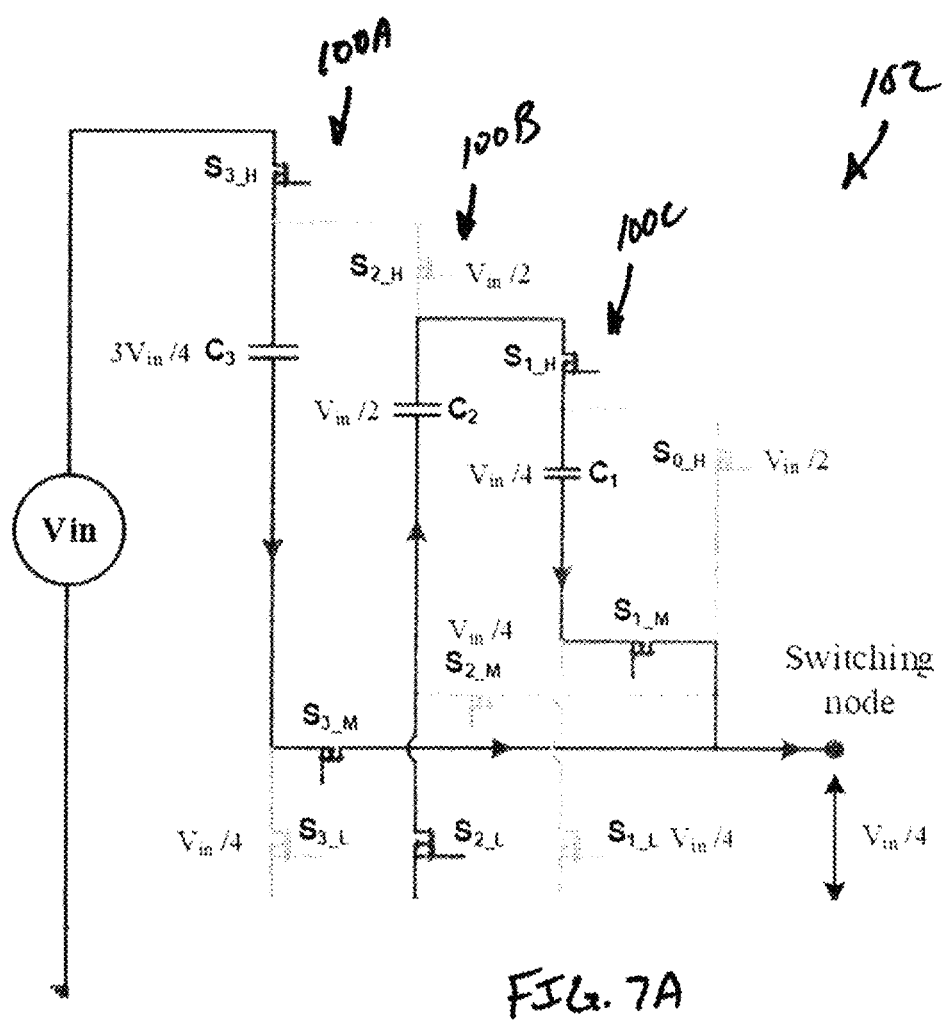
FIGS. 7A-7C are schematic diagrams illustrating operation of a three charging cells
Figure 7B:
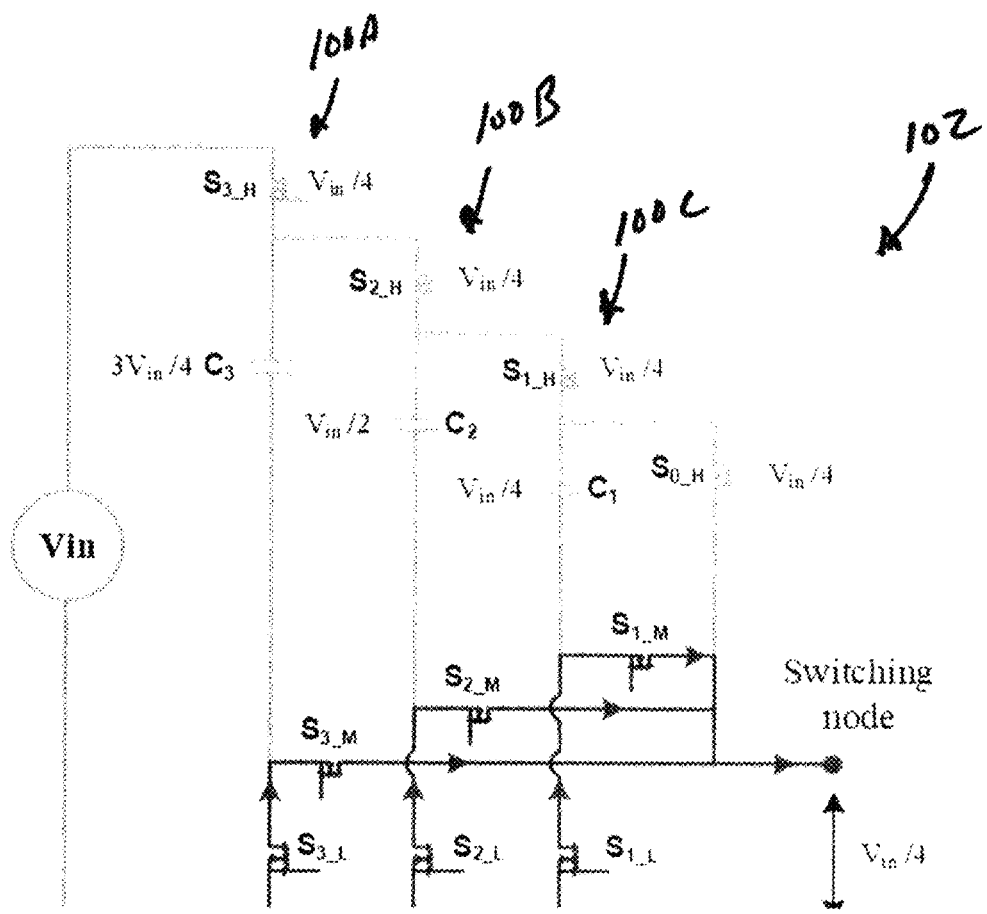
Figure 7C:
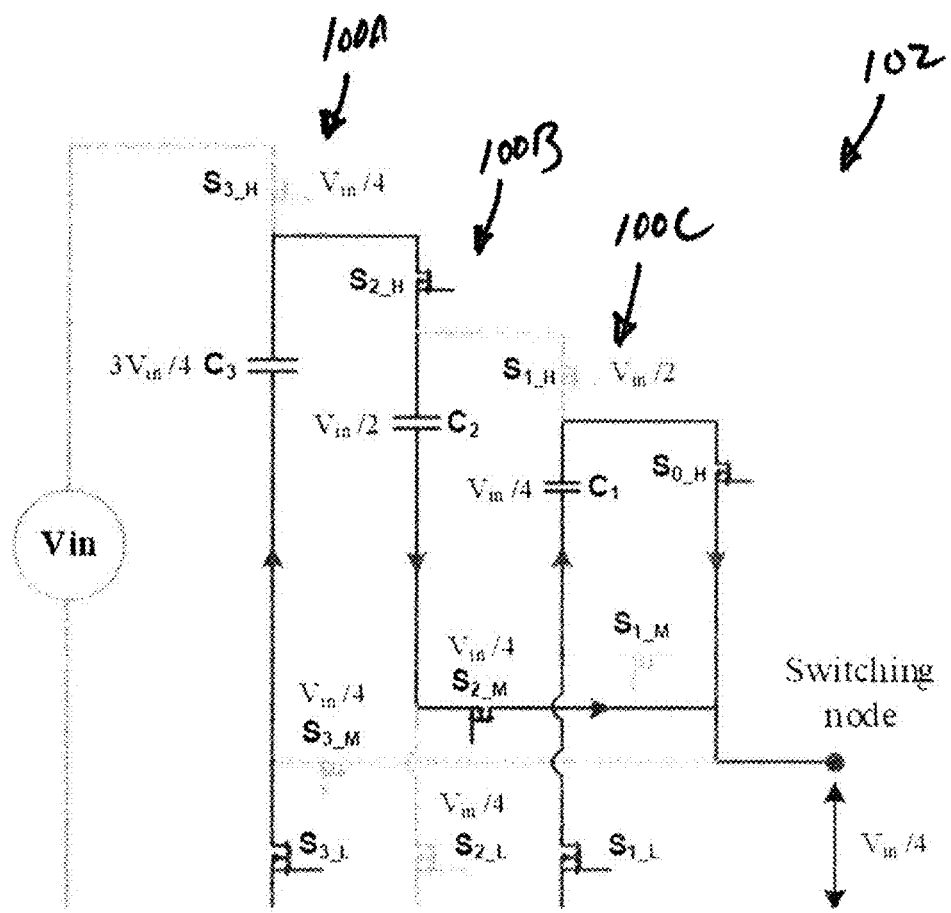

FIGS. 7A-7C illustrate the operation of a three charging cells (100A, 100B, 100C) input stage 102. It should be noted charging cells 100B and 100C would be used in the input stage 102 if only two cells are present. (If an independent claim recites two charging cells charging cells 100B and 100C are likely being claimed, while an additional cell 100A can be further added.)

A controller 131 (FIG. 14) controls operation of all of the controllable power switches and can comprise a pulse generator similar to pulse generator 37 in FIG. 4 although drive signals for the controllable power switches can be of the form described below. The dividing ratio generator 44 can provide an indication as to the input voltage to the pulse generator 37 to ascertain which and when controllable power switches are turned on and off as discussed below to achieve the desired output voltage.

There are two charging phases and two identical resting phases in one switching cycle. In the $1^{st}$ charging phase, there are two charge transfer paths. $S_{H3}$ and $S_{M3}$ are turned on so that charges are transferred from the input voltage source to $C_3$. At the same time, $S_{L2}$, $S_{H1}$ and $S_{M1}$ are turned on so that charges are also transferred from $C_2$ to $C_1$. Two charge transfer currents join at the switching node and flow into the followed power stage. A resting phase takes place after the $1^{st}$ charging transfer phase, during which all three low side power switches and all three middle side power switches are turned on. Therefore, the switching node is tied to the ground, which provides paths for current to circulate after the 1st charging phase. The 2nd charge transfer phase takes place after the resting phase. $S_{L3}$, $S_{H2}$ and $S_{M2}$ are turned on so that charges are transferred from $C_3$ to $C_2$. Also, at the same time, $S_{L1}$ and $S_{H0}$ are turned on so that $C_1$ are discharged. The timespan of the 1st charge transfer phase and the 2nd charge transfer phase are the same so that the charges transferred in and out of flying capacitors are balanced and the capacitor voltage are stable. The voltage across power switches during different phases are shown in FIGS. 7A-7C.

Under steady stage, maximum voltage across the high side power switch $S_{H3}$ in the 3rd charging cells (100C) is $V_{in}/4$. Other high side power switches have maximum voltage stress of $V_{in}/2$. All middle and low side power switches have maximum voltage of $V_{in}/4$ across them under steady stage. The flying capacitors in the charging cells are laddering down the input voltage with a step size of $V_{in}/4$. The voltage across $C_3$, $C_2$ and $C_1$ are $3V_{in}/4$, $2V_{in}/4$ and $V_{in}/4$, respectively.

Although the maximum voltage on the high side power switches $S_{H2}$ to $S_{H0}$ are $V_{in}/2$, the voltage across them are $V_{in}/4$ during resting phase, which is the voltage across the high side power switches before turn on and after turn off transitions, which is the voltage to be used to calculate the overlap switching losses on $S_{H2}$ to $S_{H0}$. The above voltage stress analysis can be generalized for a n-charging cells input stage. The maximum voltage stress on the high side power switches $S_{Hn}$ is equal to $V_{in}/(n+1)$. For all other high side power switches, the maximum voltage stresses on them are $2V_{in}/(n+1)$. For all low side power switches, the maximum voltage stresses on the them are $V_{in}/(n+1)$. The voltages across all high side power switches during resting phase is $V_{in}/(n+1)$, which should be the voltage to be used for switching loss estimation.

input voltage levels. First of all, the power switches can be selected for very confined voltage range operation. No compromise is needed to select components for wide voltage range of operation. Also, a relatively constant voltage across power switches during switching on and off also means a relatively constant switching losses, which significantly reduces switching losses under high input voltage level. In addition, a constant amplitude pulse generated by the input stage simplifies the design of the followed half-stage, allowing single or limited range of operation on the followed half-stage, such as LC filter stage, a transformer isolation stage, or a resonant tank stage. Therefore, optimal design and operation can be expected with the followed half-stage.

Figure 8A:
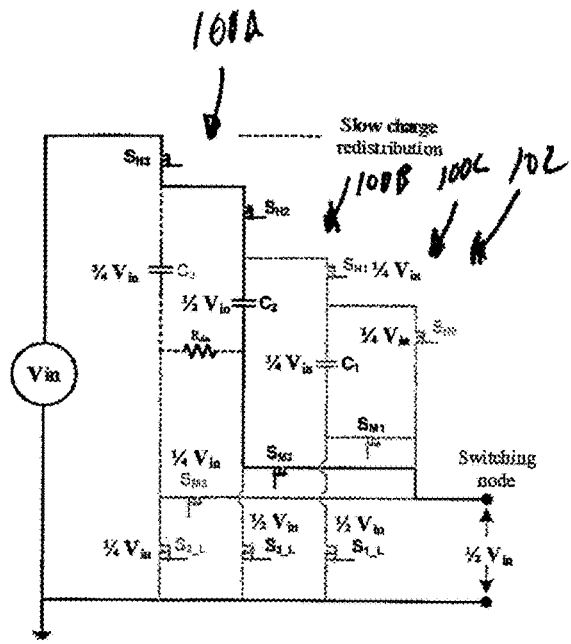
FIGS. 8A-8C are schematic diagrams illustrating transition from three effective charging cells to two effective charging cells.
Figure 8B:
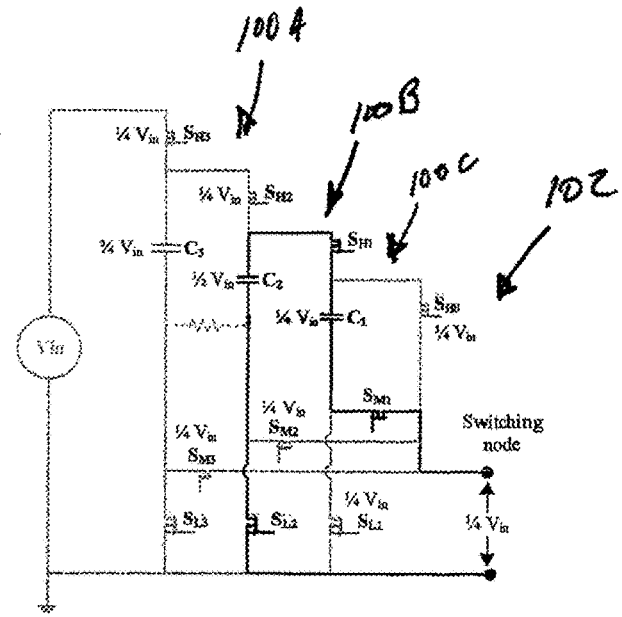
Figure 8C:
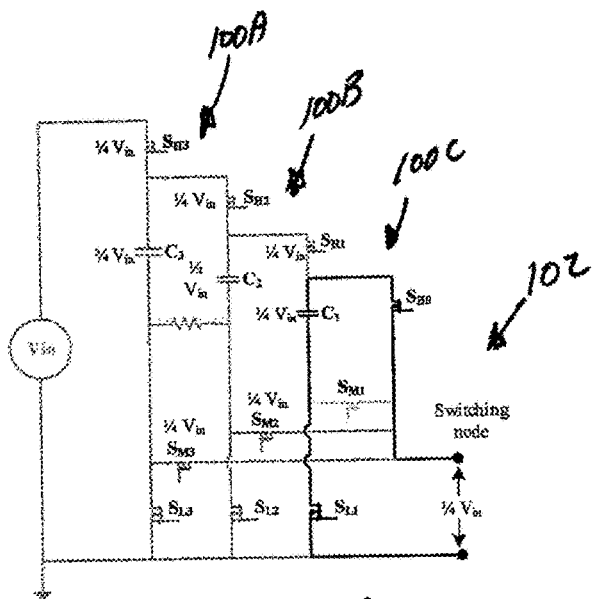

The transition operation changing the input stage from 3 effective charging cells to 2 effective charging cells is shown in FIGS. 8A-8C, during which sequential charge transfer is performed. That is, charges are transferred in sequence from Vin to C2, from C2 to C1 and from C1 to the load. The purpose of using sequential charge transfer is to avoid voltage mismatch between different current paths, which could further produces inrush current between flying capacitors. During the 1st charge transfer phase of the transition as shown in FIG. 8A, the power switches SM3 and SL3 are turned-off. This way, the capacitor C3 is essentially disconnected from the rest of the input stage and there is no charge transferred in or out of C3. The input stage is operated as if the 3rd charging cell is removed from the system. During the 1st charging phase, SH3, SH2 and SM2 are turned on to transfer charges from the input voltage to C2. At the beginning of this transition, the voltage across C2 is still Vin/2. Therefore, the voltage at the switching node is Vin/2 during the 1st charge transfer phase. During the 2nd charge transfer phase, SL2, SH1 and SM1 are turned on and charges are transferred from C2 and C1. Because the voltage on C2 and C1 are 2Vin/4 and Vin/4, respectively, the voltage at the

TABLE 3

| Number of active charging cell | Input voltage subrange (V) | Pulse amplitude at the switching node | | Voltage on high side power switches (V) | | Voltage on middle and low side power switches during steady state (V) | |
|---|---|---|---|---|---|---|---|
| 6 | [134:160) | Vin/7 | [19.1:22.8) | 2Vin/7 | [38.2:45.6) | Vin/7 | [38.2:45.6) |
| 5 | [112:134) | Vin/6 | [18.6:22.3) | Vin/3 | [37.2:44.6) | Vin/6 | [37.2:44.6) |
| 4 | [90-112) | Vin/5 | [18.4:22.4) | 2 Vin/5 | [36.8:44.8) | Vin/5 | [36.8:44.8) |
| 3 | [68-90) | Vin/4 | [17:22.5) | Vin/2 | [34:45) | Vin/4 | [34:45) |
| 2 | [46-68) | Vin/3 | [15.3:22.6) | 2Vin/3 | [30.6:45.3) | Vin/3 | [30.6:45.3) |
| 1 | [32-46) | Vin/2 | [16:23) | Vin | [32:46) | Vin/2 | [32:46) |

Reconfiguration Transition

TABLE 3 shows an exemplary configuration of a 6 charging cell input stage with the input voltage changing from 32V to 160V. The input voltage level is further segmented into 6 subranges. The input stage is configured with different number of effective charging cells in each subrange to achieve relatively constant voltage stresses on the power switches as well as pulse amplitude at the switching node. As shown in the table, the voltages on high side power switches change between 32V, as minimum under 1 charging cell configuration, and 46V as maximum under 6 charging cell configuration. The change of voltage stress on high side power switch is only 1.43 times while the input voltage change is 5 times. Similarly, the same level of change happens on the pulse amplitude of the input stage output as well as on the voltage across the middle and low side power switches. There are multiple benefits of achieving constant voltage stresses on the power switches as well as constant pulse amplitude despite a wide change of the switching node is Vin/4 during the 2nd charge transfer phase. During the 3rd charge transfer phase, SL1 and SH0 are turned on, which produces a Vin/4 pulse voltage at the switching node. The voltages of active charging cells will be rebalanced gradually with ⅔Vin on C2 and ⅓Vin on C1 and the input stage can be operated with parallel charge transfer again.

The voltage stresses on each power switch during this transition are also identified and shown in FIGS. 8A-8C. The power switches voltage stresses during configuration transitions need to be considered during part selection to maintain reliable operation. For example, in FIG. 8A, it is identified that the voltage stresses on SL2 and SL1 bump up to ½Vin, which is two times higher than they are before the transition.

To still utilizing the 3rd charging cell, an extra charge redistribution resistor Rdis can be added between the negative terminals of C3 and C2. During normal operation with 3 effective charging cell, Rdis has minimum effect on the voltage across C3 and C2 because Rdis is fairly large. During the configuration transition, Rdis will slowly redistribute the charges between C3 and C2 when SH2 is turned on and eventually equates the voltages across C2 and C3. The resistor value for Rdis is selected to be very large so that minimum static power loss will be generated when C3 and C2 are operated as separate capacitors under 3 charging cell configuration. Once the voltage on C3 and C2 are equal, the 3rd and 2nd charging cells can act together as one combined charging cell. The effective number of charging cells in the input stage is reduced to two. FIG. 5 shows the steady state operation of input stage with two effective charging cells during the 1st charge transfer phase and the 2nd charge transfer phase, during which the 3rd charging cell and the 2nd charging cell receive the supply charges at the same time, acting together as one charging cell. When the input stage is configured with odd dividing ratio, for example 3:1, the operation needs to be altered to achieve balanced capacitor voltages. Under even dividing ratio, for example, 4:1 dividing ratio, two charge transfer phases alternates in one switching cycle with the same time span. However, when the same operation is applied to odd dividing ratio configuration, the capacitor voltage would not be balance. In other words, if the two charge transfer phases shown in FIGS. 9A-9B alternate in one switching cycle with the same time span in one switching cycle, the flying capacitor voltage will not be balanced inherently.

Figure 9A:
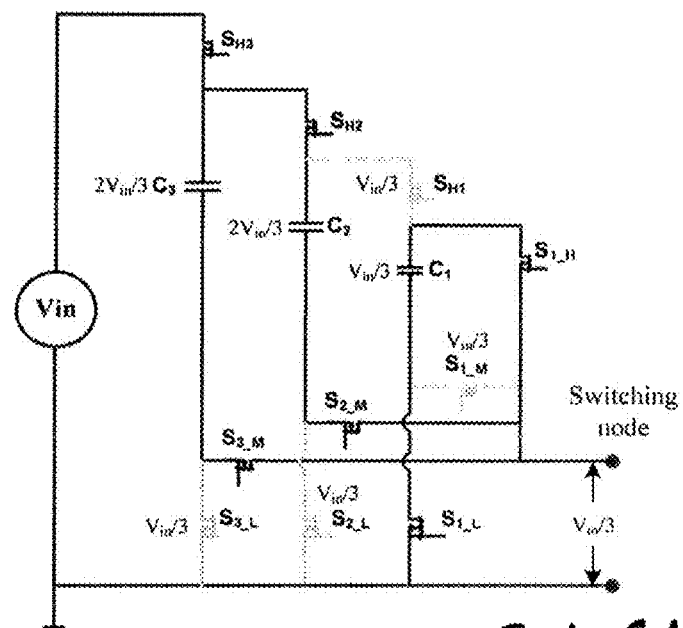
FIGS. 9A-9B are schematic diagrams illustrating charge transfer.
Figure 9B:
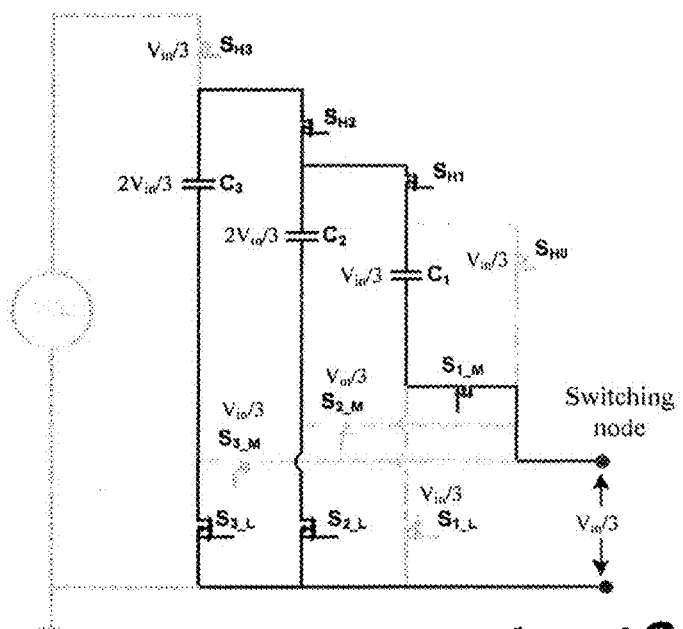
Figure 10A:
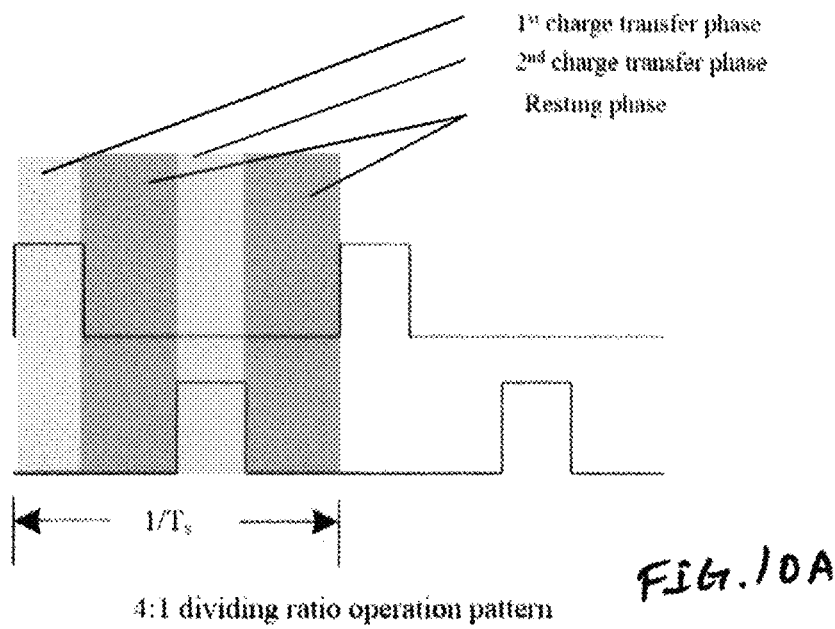
FIGS. 10A and 10B are waveform diagrams illustrating charge transfer.
Figure 10B:
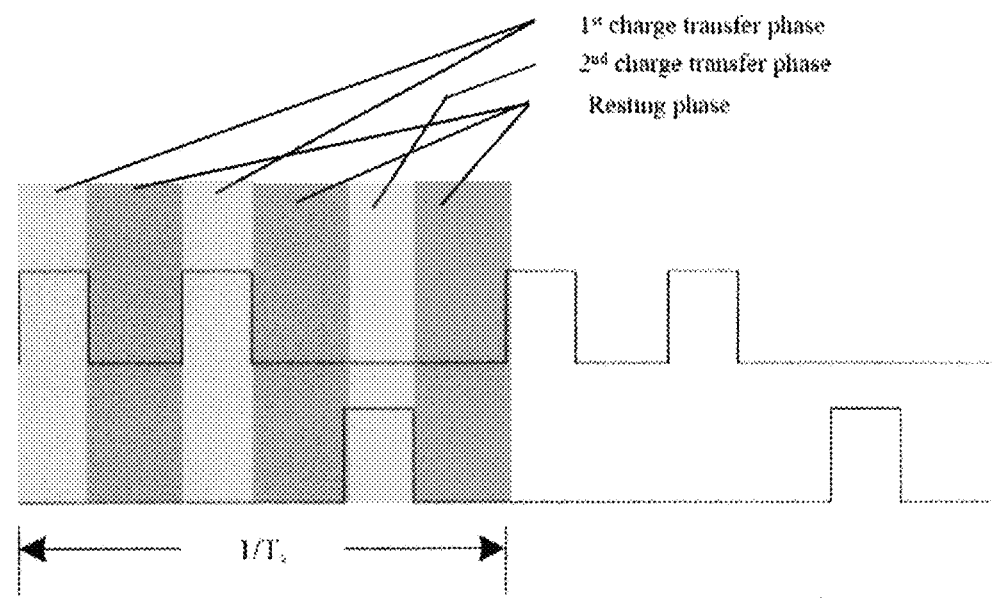

During the $2^{nd}$ charge transfer phase as shown in FIG. 9B, $C_1$ is charged by the inductor current. However, during the $1^{st}$ charge transfer phase as shown in FIG. 9A, the discharge current for C1 is not the entire inductor current. The inductor current is shared by three current paths. Therefore, the charge transferred into C1 and that transferred out of C1 are not equal if the $1^{st}$ and $2^{nd}$ charge transfer phases have the same timespan in one switching cycle. As a result, the voltages on both C3/C2 and C1 shift away from the expected $\frac{2}{3}V_{in}$ and $V_{in}/3$, respectively. To achieve flying capacitor voltage balancing, the timespan of the $1^{st}$ charge transfer period should be greater than the timespan of $2^{nd}$ charge transfer period in one switching cycle. One way to achieve that is operating under $1^{st}$ charge transfer phase and the $2^{nd}$ charge transfer phase with different counts in one switching cycle. For example, the $1^{st}$ charge transfer phase occurs two times while the $2^{nd}$ charge transfer phase occur one time in one switching cycle. FIGS. 10A-10B show the operation pattern for 4:1 and 3:1 dividing ratios. Under 4:1 dividing ratio shown in FIG. 10A, both the $1^{st}$ and the $2^{nd}$ charge transfer phases occurs one time in one switching cycle with the same timespan. Under 3:1 dividing ratio shown in FIG. 10B, the $1^{st}$ charge transfer phase occurs two times and the $2^{nd}$ charge transfer phase occurs one time in one switching cycle. The capacitor C1 is discharged two times and charged one time in one switching cycle. Under steady state, the system will automatically achieve an equilibrant point so that the charge flowing into $C_1$ is equal to the charge flowing out of $C_1$ in one switching cycle.

Feedforward Control

Figure 11:
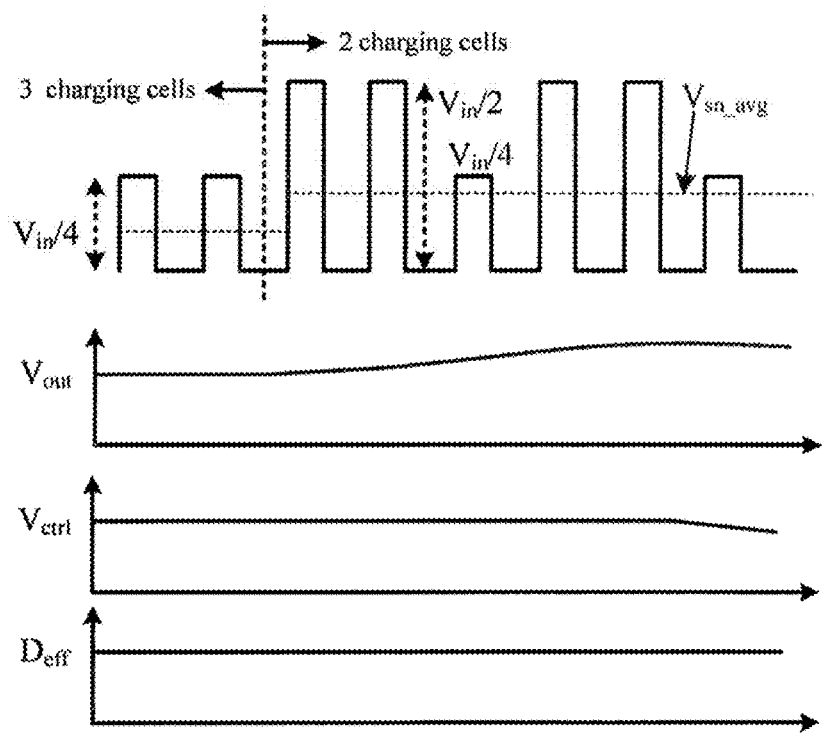
FIG. 11 is a waveform diagram of selected voltages for the feedforward control of FIG. 12.

Before the transition when there are still 3 effective charging cells, the amplitude of the pulse voltage at the switching node is $V_{in}/4$. At the very beginning of the transition when the input stage is configured with two effective charging cells, the pulse voltages at the switching node, are uneven during the $1^{st}$ and the $2^{nd}$ charging phase because the capacitor voltages are not balanced yet. During the $1^{st}$ charge transfer phase, the voltage at the switching node is $2V_{in}/4$ (the $1^{st}$ charge transfer phase operation occurs two times). During the $2^{nd}$ charging phase, the voltage presents at the switching node is equal to $\frac{1}{4}V_{in}$. Without the proposed feedforward control, the duty cycle immediately after the transition remains unchanged until an overshoot is detected by the feedback loop. Therefore, an abrupt increase of average voltage at the switching node occurs immediately after the transition. A sizable output voltage overshoot can be produced when the feedback loop is not fast enough. FIG. 11 illustrates the pulse voltage change at the switching node shortly after the transition and a possible output voltage overshoot caused by that if the feedback loop is not fast enough.

Assume that the effective duty cycle shows in FIG. 11 is $D_{eff}$. Before the transition, the average voltage presenting at the switching node is Vin/4. $D_{eff}$. Immediately after the transition, the average voltage at the switching node abruptly jump to $5V_{in}/12$. $D_{eff}$ if $D_{eff}$ remains unchanged. An increased average voltage at the switching node will further pass on to the output voltage and lead to output voltage overshoot. In this disclosure, a feedforward control is introduced to eliminate overshoot for a designs based on pulse width modulation voltage regulation. The feedback loop can be designed as it normally would to ensure voltage regulation under steady stage and the step load conditions. The potential disturbance caused by input stage reconfiguration is taken care of by the feedforward control.

Figure 12:
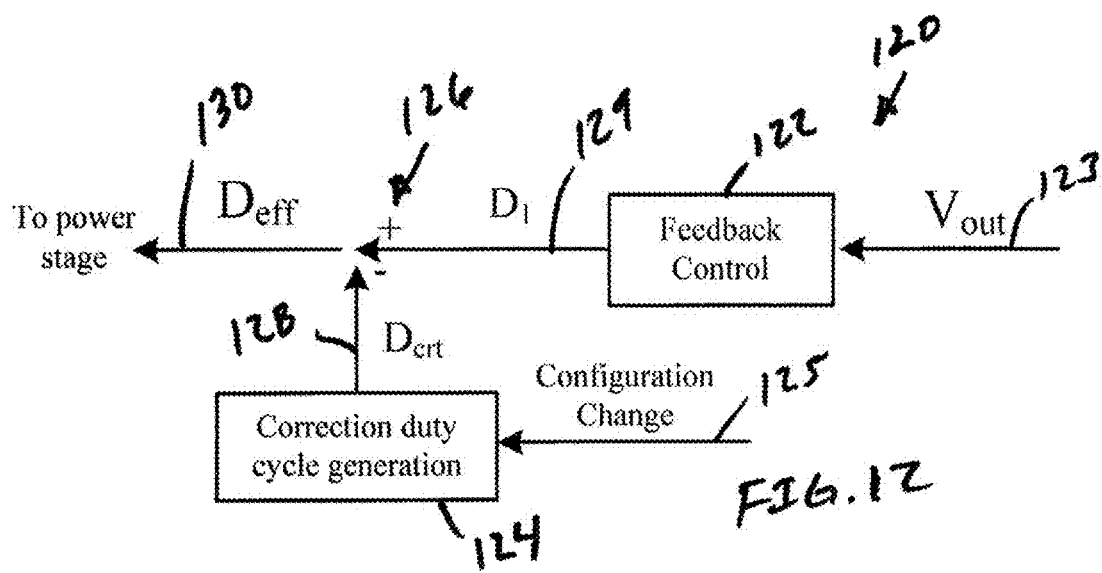
FIG. 12 is a block diagram of feedforward control.
Figure 13:
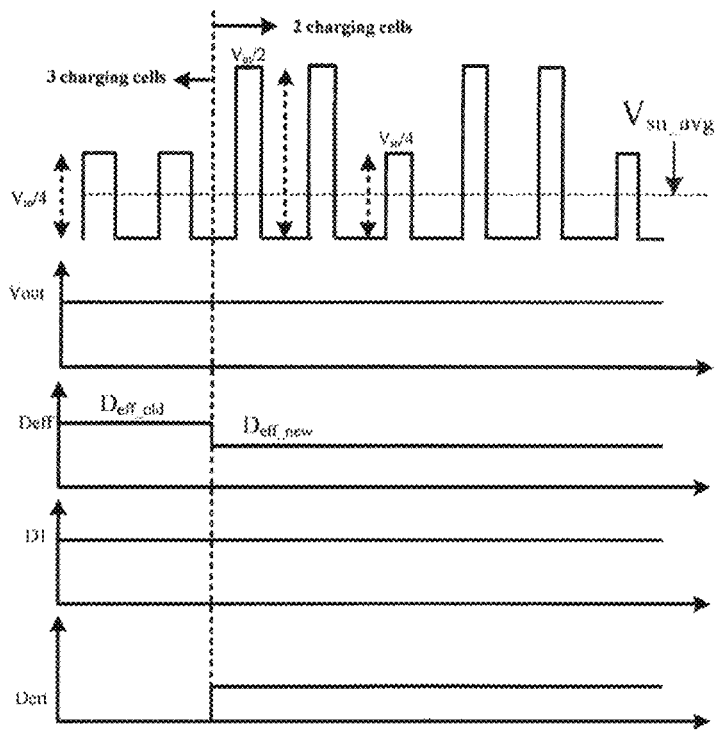
FIG. 13 is a waveform diagram of selected voltages for control circuit of FIG. 14.

FIG. 12 shows the concept of the feedforward control 120. Generally, feedforward control includes feedback control circuit 122 receiving as an input $V_{out}$ 123. A duty cycle correction function is added in the control scheme using generator 124. The generator 124 receives as input a configuration change request 125. Under normal operation, the correction duty cycle will not be applied. The effective duty cycle of the pulse at the switching node is controlled by the feedback loop 120. The duty cycle correction function is activated when there is a transition between configurations. A correction duty cycle output, $D_{crt}$, 128 is generated when the system is undergoing a reconfiguration transition. $D_{crt}$ is added at summer 126 to the duty cycle $D_1$ 129 produced by the feedback control circuit 122, to update the effective duty cycle $D_{eff}$ 130 The correction duty cycle is estimated based on the configuration change scheme. For example, when the input stage is configured with 3 effective charging cells like described above, the amplitude of the pulse voltage at the switching node is Vin/4. Immediately after the transition to 2 effective charging cells, the amplitude of the pulse at the switching node alternates between $V_{in}/4$ and $V_{in}/2$ as shown in FIGS. 11 and 12. Let us call the effective duty cycle before the transition $D_{eff\_old}$ and the updated duty cycle $D_{eff\_new}$ when $C_{crt}$ is applied. To maintain a constant average voltage at the switching node, the following relationship needs to be met:

$$D_{eff\_old} \times V_{in}/4 = D_{eff\_new} \times \frac{5V_{in}}{12} \quad (1)$$

Therefore, the correction duty cycle $D_{crt}$ is calculated:

$$D_{crt} = D_{eff\_new} - D_{eff\_old} \quad (2)$$

The required correction duty cycle will be different between different configurations transitions. A look-up table can be used to store $D_{crt}$ 128 values for different transition cases. It is worth noting the feedback control circuit 122 is still actively responding to any output voltage disturbance and regulating the output voltage at any instant as it normally would. 13 illustrates how to use the feedforward control 120 to maintain an unchanging average voltage at the switching node during a transition, which ultimately help achieving an unchanging output voltage.

As the capacitor voltages gradually moving toward steady state values under two effective charging cells configuration, the initially assigned $C_{crt}$ does not reflect the required duty cycle correction anymore. During this process, the feedback control circuit 122 automatically adjusts the duty cycle $D_1$ to keep output voltage regulated. Also at detailed implementation level, it may be desirable to slowly bring the correction duty cycle $D_{crt}$ back to zero after the initial assigned value. In this way, the $D_{crt}$ value will not built up in the system after each transition. The feedback control circuit 122 will automatically respond to the slow change of $D_{crt}$ so that the output voltage is kept well regulated and no disturbance will be produced at the output.

Hysteresis Loop for Dividing Ratio Transition

In a practical design, the sensed input voltage contains a lot of noise. To avoid false trigger and system bounce back and forth between different input stage configurations, a hysteresis loop can be added when set dividing ratio for the input stage.

Start-Up Circuit Design

Figure 14:
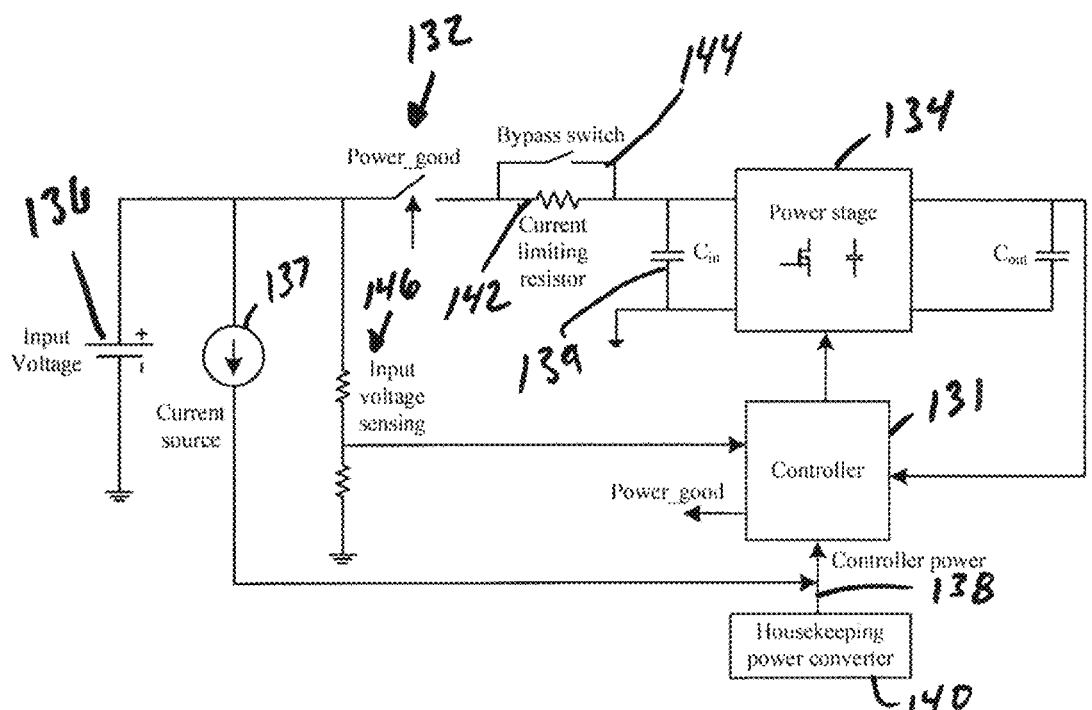
FIG. 14 is a schematic diagram of a control circuit.

One issue needs that should be addressed for hybrid switched capacitor converter during start-up is voltage balancing between flying capacitors. In this way, the voltage stresses on power switches can stay at proper level. Under steady stage, the input voltage is laddered down by flying capacitor so that the voltage on the power switches are much smaller than input voltage and smaller voltage rating power switches can be used. At the very beginning, all flying capacitors are not charged and the voltage on flying capacitors are not properly balanced. There is a need to balance the capacitor voltage before the input capacitor is charged with too high voltage so that the voltage stresses on power switches are at proper levels. FIG. 14 depicts the idea of achieving smooth and well controlled start-up.

First of all, the controller 131 needs to be powered up first before the main power stage is. This way, the power stage can be configured and operated properly with a smooth start-up process. A power good switch 132 is used to separate the power stage 134 from the input voltage source 136. The power-good switch 132 is off at very beginning of a start-up. It is only turned on when receiving a power-good signal from the controller 131. A current source 137 is added between the input voltage 136 and the controller power 138. The input voltage source 136 supplies power to the controller 131 through the current source 137 during the start-up. Under steady stage, it is usually not efficient to direct supply power to the controller 131 from the input voltage 136 when the difference between the input voltage 136 and the controller power 138 is great. The current source 137 is usually disabled under steady state to reduce power loss. A housekeeping converter 140 takes over after start up to supply power to the controller 131. The housekeeping voltage from housekeeping converter 140 can be generated more efficiently. For example, in isolated converter designs, such a housekeeping voltage can be generated by extra transformer winding (not shown) with additional associated circuitry. For non-isolated designs, the housekeeping power can be generated from another low voltage source, such as the output voltage. For example, a small integrated circuit power module can be used to implement the housekeep converter 140 that converts the output voltage to the supply voltage for controller 131.

In addition to power the controller circuit first, the input capacitor, $C_{in}$ 139, should be charged slowly with small current during a start-up. The input capacitor voltage should be controlled to ramp up slow, which buy times to achieve balanced flying capacitor voltages before the input capacitor voltage is too high. A widely used solution to limit start-up current in industry is placing Negative Temperature Coefficient (NTC) thermistors in series in the input line. During start-up when the NTC is still cold, the resistance is higher, which limits the charging up current flowing into the input capacitor 139. Under steady state when NTC is hot, the resistance of a NTC is much smaller and it consumes minimum power. A more advanced solution commonly used is employing a combo of parallel connected current limiting resistor 142 and bypass power switch 144 (sometimes use relay as well) and put the combo in series in the input line. The power switch 144 is off during start-up so that the current limiting resistor 142 is engaging and slow down the charging process for the input capacitor 139. The ladder capacitor voltages are balanced during the time the input capacitor voltage ramps up. Under steady state, the bypass power switch 144 is turned on so that minimum conduction loss is produced. An input voltage sensing circuit 146 is also needed to sense the input voltage level 136 and signals the controller 131 so that the controller 131 can configure the input stage with proper dividing ratio.

Bootstrap Circuit for Gate Driving

Figure 15A:
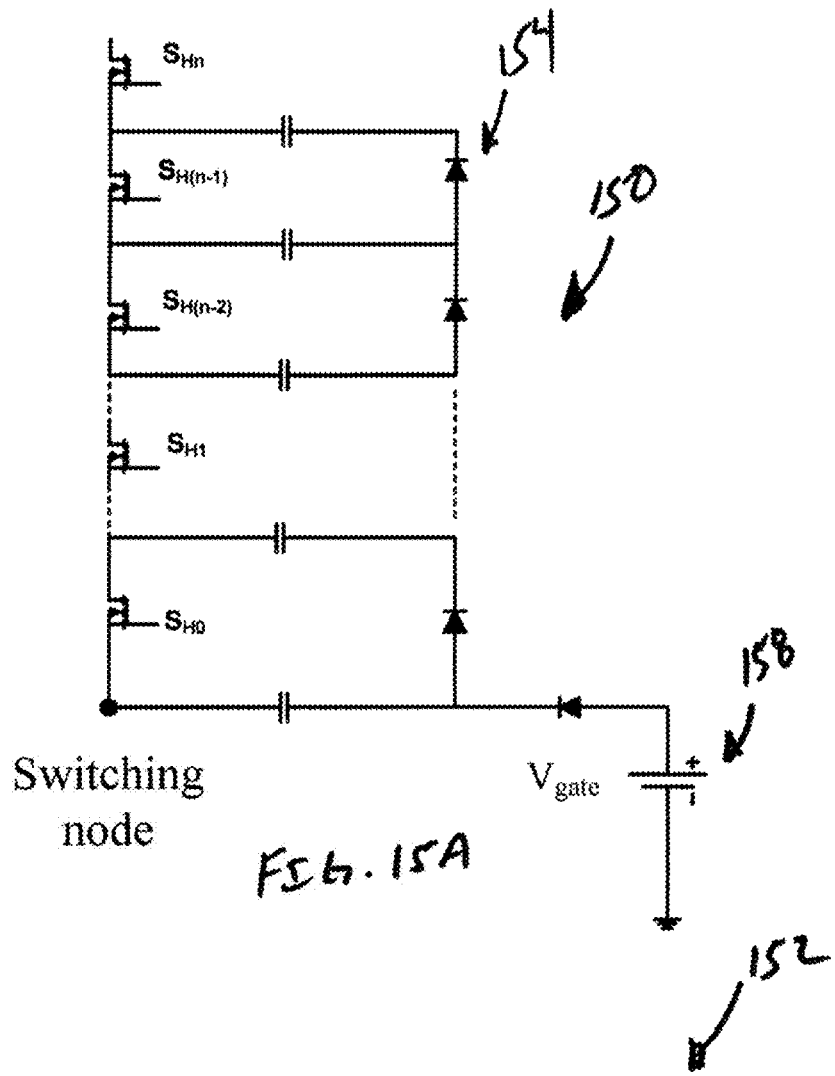
FIGS. 15A and 15B a schematic circuit diagrams of bootstrap circuits.
Figure 15B:
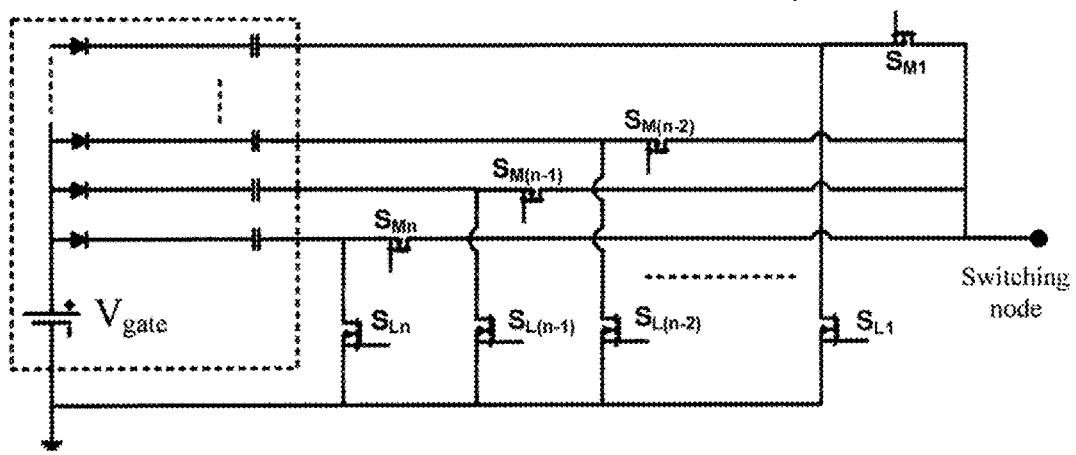

Since the source terminals of middle and high side power switches are not tied to the ground of the system, bootstrap circuits may be required to generate power supplies for the gate driving circuits driving all middle and high side power switches. FIGS. 15A and 15B shows the bootstrap circuits 150, 152, for the high side and the middle side power switches, respectively, in the input stage.

The bootstrap circuit 150 for high side power switches is in a cascade structure with one gate driving supply voltage being replenished by another gate driving supply voltage for gates $S_{HO}$-$S_{HN}$. For example, when $S_{H1}$ is turned on, the power supply for the gate driver of $S_{H1}$, is replenished by the power supply for the gate driver of $S_{OH}$. Other gate driving supply voltages are all generated in the same way. The rectifier diodes 154 between these gate driving supply voltages introduce extra voltage drop. To compensate for the voltage drops from this cascade diode connection, the supply voltage $V_{gate}$ 158 should have enough margin so that the generated gate driving supply voltage at the end of the chain is high enough to drive $S_{Hn}$. A linear regulator may be also used to achieve fine gate to source voltage regulation. The bootstrap circuit 152 for the middle side power switches is in a parallel structure, and gate driving voltage for each middle side power switch is generated separately.

A hybrid SC power conversion structure with reconfigurable modular charging cell input stage is proposed, which leverages the structural advantages of hybrid SC converters in wide input voltage range designs. The input stage can be reconfigured with different number of effective charging cells based on the input voltage level. This way, the switching voltages on the power switches are maintained relatively constant despite a wide range change of the input voltage level. Switching losses under high input voltage can be significantly reduced and a relatively constant efficiency is achievable.

A power conversion structure is proposed that can be widely adopted. Since the proposed input stage generates a pulse output, it has the potential to replace a conventional half-bridge in a variety of designs. The estimated total loss of the proposed input stage is significantly smaller than that would be generated by the best conventional half-bridge input stage design. Also, the input stage is highly scalable. The number of gain options can be freely increased with additional charging cells, suiting extreme wide input voltage range design requirements, such as 12:1 input voltage ratio designs.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. An input stage circuit for a power converter, the input stage circuit comprising:
   input terminals configured to receive power from a voltage source, comprising a first input terminal and a second input terminal;
   a plurality of controllable power switches connected in series across the input terminals;
   output terminals comprising a first output terminal connected to series connected terminals of a pair of power switches such that an upper one half of the plurality of controllable power switches are connected in series to the first input terminal and a lower one half of the plurality of controllable power switches are connected in series to the second input terminal, a second output terminal being one of the first input terminal or the second input terminal;
   a plurality of capacitors and a plurality of controllable capacitor switches, wherein each capacitor switch is connected in series with a capacitor of the plurality of capacitors,
      wherein a terminal of a first capacitor opposite the associated capacitor switch is connected to a terminal of a first upper power switch of the upper one half of the plurality of controllable power switches that is on a side opposite the first output terminal, and wherein a terminal of the associated capacitor switch opposite the first capacitor is connected to a terminal of a first lower power switch of the lower one half of the plurality of controllable power switches that is on a side opposite the first output terminal, and
      wherein a terminal of a second capacitor opposite the associated capacitor switch is connected to a terminal of a second upper power switch of the upper one half of the plurality of controllable power switches that is on a side opposite the first upper power switch, and wherein a terminal of the associated capacitor switch opposite the second capacitor is connected to a terminal of a second lower power switch of the lower one half of the plurality of controllable power switches that is on a side opposite the first lower power switch;
   a controller configured to selectively operate each power switch of the plurality of power switches and each capacitor switch so as to generate a pulsed voltage wherein an amplitude of pulses of the pulsed voltage is selected based on a number of capacitors electrically connected to receive and dissipate charge.

2. The input stage of claim 1 wherein the plurality of capacitors and the plurality of controllable capacitor switches comprise a third capacitor and associated capacitor switch, wherein a terminal of the third capacitor opposite the associated capacitor switch is connected to a terminal of a third upper power switch of the upper one half of the plurality of controllable power switches that is on a side opposite the second upper power switch, and wherein a terminal of the associated capacitor switch opposite the third capacitor is connected to a terminal of a third lower power switch of the lower one half of the plurality of controllable power switches that is on a side opposite the second lower power switch.

3. The input stage of claim 1 wherein the controller comprises pulse generator providing control signals to each of the controllable power switches based on a reference pulsed voltage signal and an input signal indicative of the number of capacitors electrically connected to receive and dissipate charge.

4. The input stage of claim 3 wherein the controller comprises a ratio generator providing the input signal indicative of the capacitors electrically connected to receive and dissipate charge based on a voltage on the input terminals.

5. The input stage of claim 3 wherein the controller comprises a pulse width modulator to generate the reference pulsed voltage signal.

6. An input stage circuit for a power converter, the input stage circuit comprising:
   input terminals configured to receive power from a voltage source, comprising a first input terminal and a second input terminal;
   a plurality of controllable power switches connected in series across the input terminals;
   output terminals comprising a first output terminal connected to series connected terminals of a pair of power switches such that an upper one half of the plurality of controllable power switches are connected in series to the first input terminal and a lower one half of the plurality of controllable power switches are connected in series to the second input terminal, a second output terminal being one of the first input terminal or the second input terminal;
   a plurality of capacitors,
      wherein a first terminal of a first is connected to a terminal of a first upper power switch of the upper one half of the plurality of controllable power switches that is on a side opposite the first output terminal, and wherein a second terminal of the first capacitor is connected to a terminal of a first lower power switch of the lower one half of the plurality of controllable power switches that is on a side opposite the first output terminal, and
      wherein a first terminal of a second capacitor is connected to a terminal of a second upper power switch of the upper one half of the plurality of controllable power switches that is on a side opposite the first upper power switch, and wherein a second terminal of the second capacitor is connected to a terminal of a second lower power switch of the lower one half of the plurality of controllable power switches that is on a side opposite the first lower power switch;
   a controller configured to selectively operate each power switch of the plurality of power switches so as to generate a pulsed voltage wherein an amplitude of pulses of the pulsed voltage is selected based on a number of capacitors electrically connected to receive and dissipate charge.

7. The input stage of claim 6 wherein the plurality of capacitors comprise a third capacitor, wherein a first terminal of the third capacitor is connected to a terminal of a third upper power switch of the upper one half of the plurality of controllable power switches that is on a side opposite the second upper power switch, and wherein a second terminal of the third capacitor is connected to a terminal of a third lower power switch of the lower one half of the plurality of controllable power switches that is on a side opposite the second lower power switch.

8. The input stage of claim 6 wherein the controller comprises pulse generator providing control signals to each of the controllable power switches based on a reference pulsed voltage signal and an input signal indicative of the number of capacitors electrically connected to receive and dissipate charge.

9. The input stage of claim 8 wherein the controller comprises a ratio generator providing the input signal indicative of the capacitors electrically connected to receive and dissipate charge based on a voltage on the input terminals.

10. The input stage of claim 8 wherein the controller comprises a pulse width modulator to generate the reference pulsed voltage signal.

11. An input stage circuit for a power converter, the input stage circuit comprising:
   input terminals configured to receive power from a voltage source, comprising a first input terminal and a second input terminal;
   output terminals comprising a first output terminal and a second output terminal connected to the second input terminal;
   a first charging cell comprising a first controllable power switch having a first terminal configured to receive current from the first input terminal and a second terminal connected to a first terminal of a first capacitor, the second terminal of the first capacitor being connected to a first terminal of a second controllable power switch, a second terminal of the second controllable power switch being connected to the second input terminal, and a third controllable power switch having a first terminal connected to the second terminal of the first capacitor and a second terminal connected to the first output terminal;
   a second charging cell comprising a fourth controllable power switch having a first terminal connected to a second terminal of the first controllable power switch and a second terminal connected to a first terminal of a second capacitor, the second terminal of the second capacitor being connected to a first terminal of a fifth controllable power switch, a second terminal of the fifth controllable power switch being connected to the second input terminal, a sixth controllable power switch having a first terminal connected to the second terminal of the second capacitor and a second terminal connected to the first output terminal, and a further controllable power switch having a first terminal connected to the first terminal of the second capacitor and a second terminal connected to the first output terminal; and
   a controller receiving an input signal indicative of a voltage across the input terminals and configured to selectively operate each of the controllable power switches so as to generate a pulsed voltage of selectable amplitude being less than the voltage across the input terminals.

12. The input stage circuit of claim 11 and further comprising:
   a third charging cell comprising a seventh controllable power switch having a first terminal connected to the first input terminal and a second terminal connected to the first terminal of the first controllable power switch and a first terminal of a third capacitor, the second terminal of the third capacitor being connected to a first terminal of an eight controllable power switch, a second terminal of the eighth controllable power switch being connected to the second input terminal, and a ninth controllable power switch having a first terminal connected to the second terminal of the third capacitor and a second terminal connected to the first output terminal.

13. The input stage circuit of claim 12 and further comprising a resistor connected to the second terminal of the second capacitor and the second terminal of the third capacitor.

14. The input stage circuit of claim 12 wherein the controller is configured to operate the controllable power switches in a repeating cycle comprising a first charge transfer state, two occurrences of a rest state and a second charge transfer state,
   wherein in the first charge transfer state the first and third controllable power switches are turned on so that charge is transferred from the input terminals to the first capacitor, and at the same time the fifth, seventh and ninth controllable power switches are turned on so as to transfer charge from the second capacitor to the third capacitor, all other controllable power switches are turned off,
   wherein following the first charge transfer state, in a first occurrence of the rest state the second, third, fifth, sixth, eighth and ninth controllable power switches are turned on and all other controllable power switches are turned off,
   wherein following the first occurrence of the rest state, in the second charge transfer state the second, fourth and sixth controllable power switches are turned on to transfer charge from the first capacitor to the second capacitor, and at the same time the eighth and tenth controllable power switches are turned on to discharge the third capacitor and all other controllable power switches are turned off, and
   wherein following the second charge transfer state, a second occurrence of the rest state the second, third, fifth, sixth, eighth and ninth controllable power switches are turned on and all other controllable power switches are turned off.

15. The input stage circuit of claim 12 wherein the controller is configured to operate the controllable power switches in a repeating cycle comprising a two occurrences of a first charge transfer state, three rest states and a second charge transfer state,
   wherein in a first occurrence of a first charge transfer state the first, third, fourth and sixth controllable power switches are turned on, and at the same time the fifth and tenth controllable power switches are turned on, all other controllable power switches are turned off,
   wherein following the first occurrence of the first charge transfer state, in a first occurrence of the rest state the second, third, fifth, sixth, eighth and ninth controllable power switches are turned on and all other controllable power switches are turned off,
   wherein following the first occurrence of the rest state in a second occurrence of the first charge transfer state the first, third, fourth and sixth controllable power switches are turned on, and at the same time the fifth and tenth controllable power switches are turned on, all other controllable power switches are turned off,
   wherein following the second occurrence of the first charge transfer state, in a first second occurrence of the rest state the second, third, fifth, sixth, eighth and ninth controllable power switches are turned on and all other controllable power switches are turned off, wherein following the second occurrence of the first charge transfer state, in a second occurrence of the rest state the second, third, fifth, sixth, eighth and ninth controllable power switches are turned on and all other controllable power switches are turned off, wherein following the second occurrence of the rest state in a second charge transfer state the second, fourth, fifth, seventh and ninth controllable power switches are turned on and all other controllable power switches are turned off, wherein following the second charge transfer state, in a third occurrence of the rest state the second, third, fifth, sixth, eighth and ninth controllable power switches are turned on and all other controllable power switches are turned off.

16. The input stage circuit of claim 11 and further comprising and a plurality of controllable capacitor switches, wherein one capacitor switch of the plurality of controllable capacitor switches is connected in series with each capacitor of the plurality of capacitors.

\* \* \* \* \*